United States Patent
Yamamoto et al.

(10) Patent No.: US 7,046,344 B2
(45) Date of Patent: May 16, 2006

(54) RANGE FINDER

(75) Inventors: Toshio Yamamoto, Nagano (JP); Akio Izumi, Nagano (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 178 days.

(21) Appl. No.: 10/759,278

(22) Filed: Jan. 20, 2004

(65) Prior Publication Data

US 2004/0263824 A1 Dec. 30, 2004

(30) Foreign Application Priority Data

Jun. 25, 2003 (JP) .............................. 2003-181171

(51) Int. Cl.
*G01C 3/08* (2006.01)

(52) U.S. Cl. .................... 356/4.01; 356/4.02; 356/4.03; 356/4.1; 356/5.1

(58) Field of Classification Search ................ 356/4.01
See application file for complete search history.

(56) References Cited

U.S. PATENT DOCUMENTS

| | | | | | |
|---|---|---|---|---|---|
| 5,315,609 | A | * | 5/1994 | Tanaka et al. | 372/50.23 |
| 5,760,885 | A | * | 6/1998 | Yokoyama et al. | 356/4.01 |
| 2002/0134000 | A1 | * | 9/2002 | Varshneya et al. | 42/115 |

FOREIGN PATENT DOCUMENTS

| | | | |
|---|---|---|---|
| JP | 10-232128 | * | 2/1998 |
| JP | 10-232128 | | 9/1998 |
| JP | 3310079 | | 5/2002 |

* cited by examiner

*Primary Examiner*—Thomas H. Tarcza
*Assistant Examiner*—Luke Ratcliffe
(74) *Attorney, Agent, or Firm*—Manabu Kanesaka

(57) ABSTRACT

A range finder includes a package, a semiconductor chip, an optical casing, a lens holder, a first lens, and a second lens. The first and second lenses are attached to the lens holder. The lens holder is formed of a material having a thermal expansion coefficient equal or close to that of the semiconductor chip. The range finder is constructed such that a distance between the two lenses and a distance between two light detecting sections on the semiconductor chip do not change significantly relative to each other due to the thermal expansion or contraction.

8 Claims, 13 Drawing Sheets

Fig. 1(a)
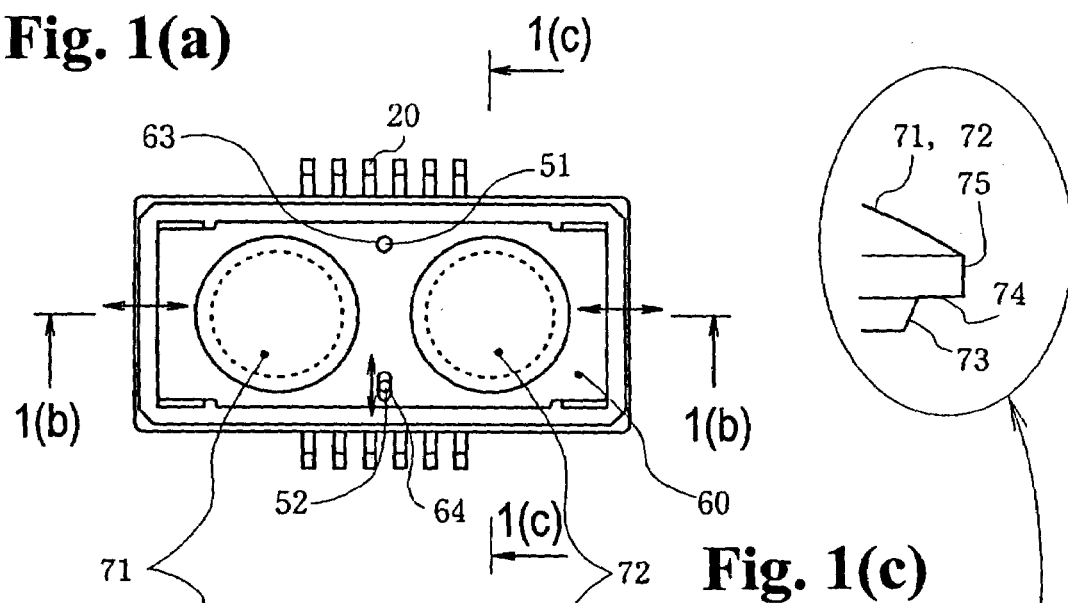
Fig. 1(b)
Fig. 1(c)
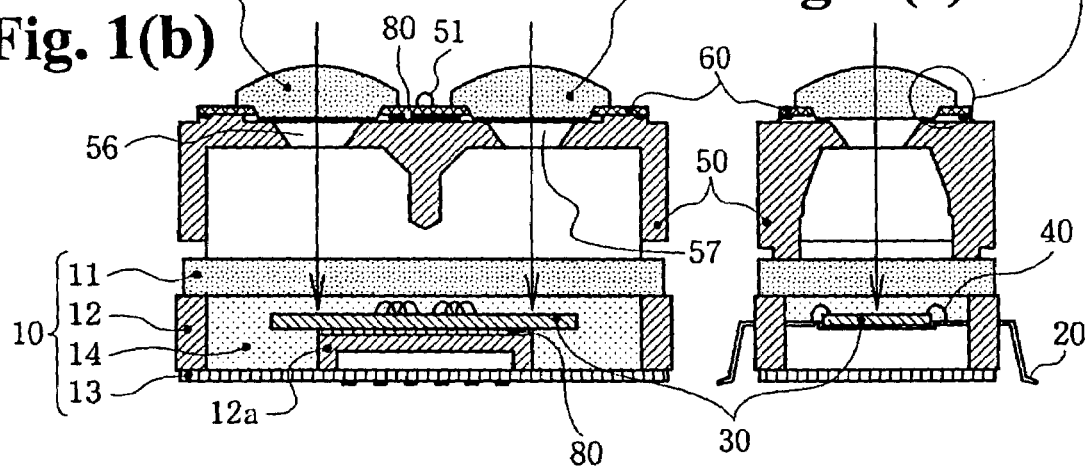

Fig. 5(a)
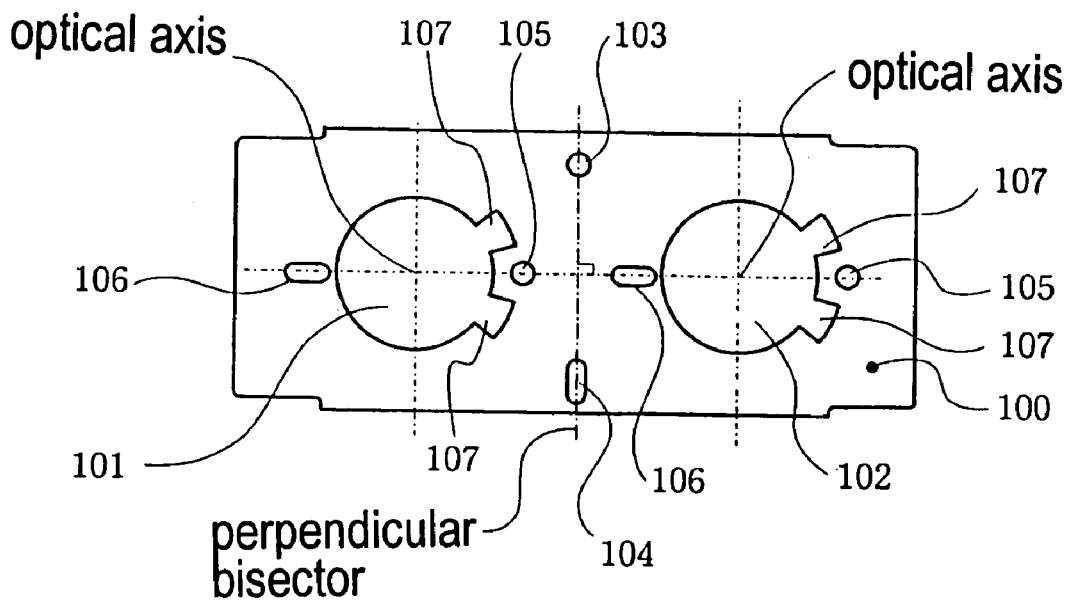
Fig. 5(b)
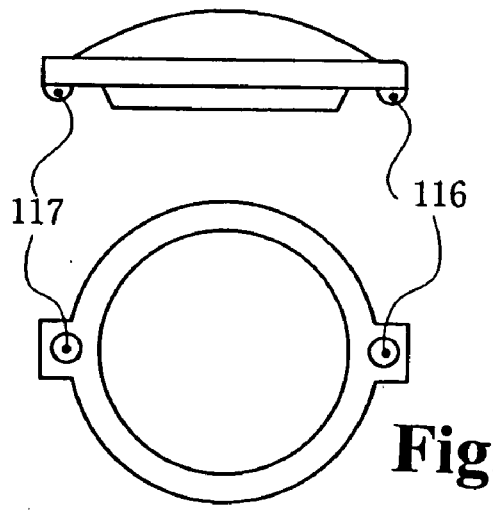
Fig. 5(d)
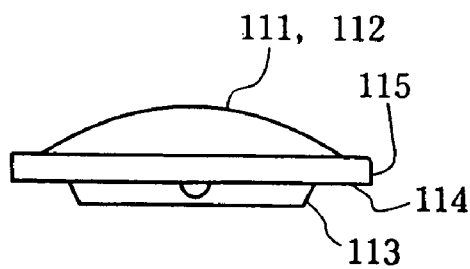
Fig. 5(c)

Fig. 7(b) Fig. 7(c)

Fig. 11(a) Prior Art
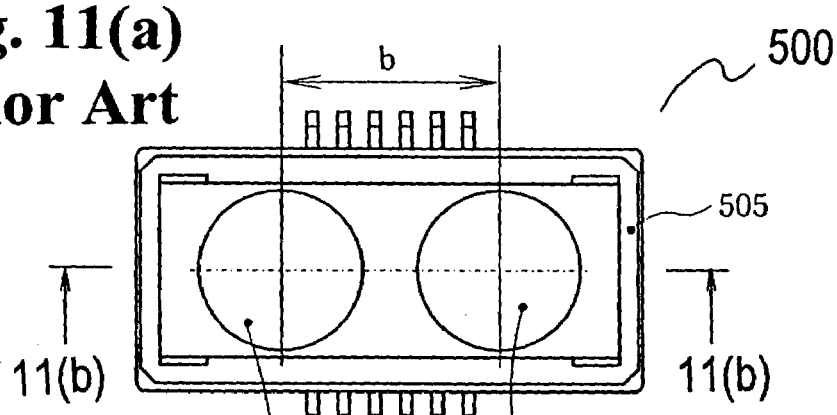
Fig. 11(b) Prior Art
Fig. 11(c) Prior Art
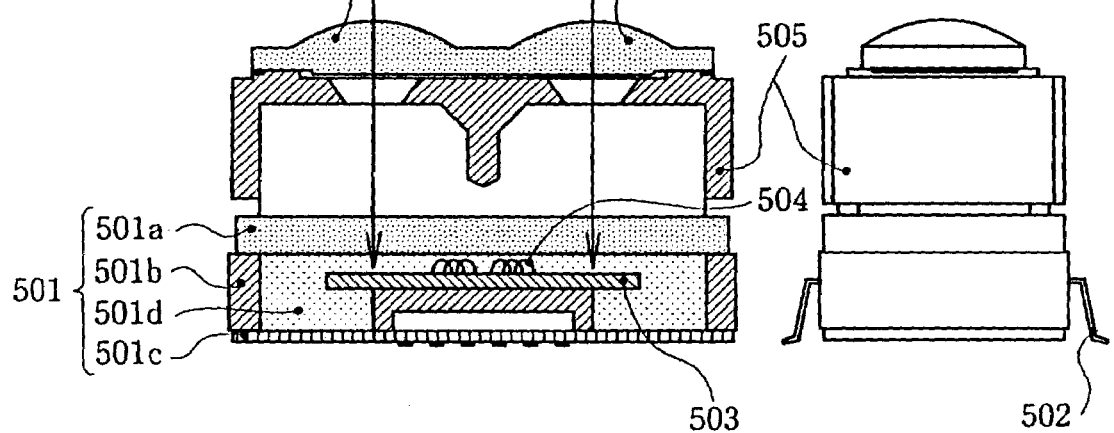

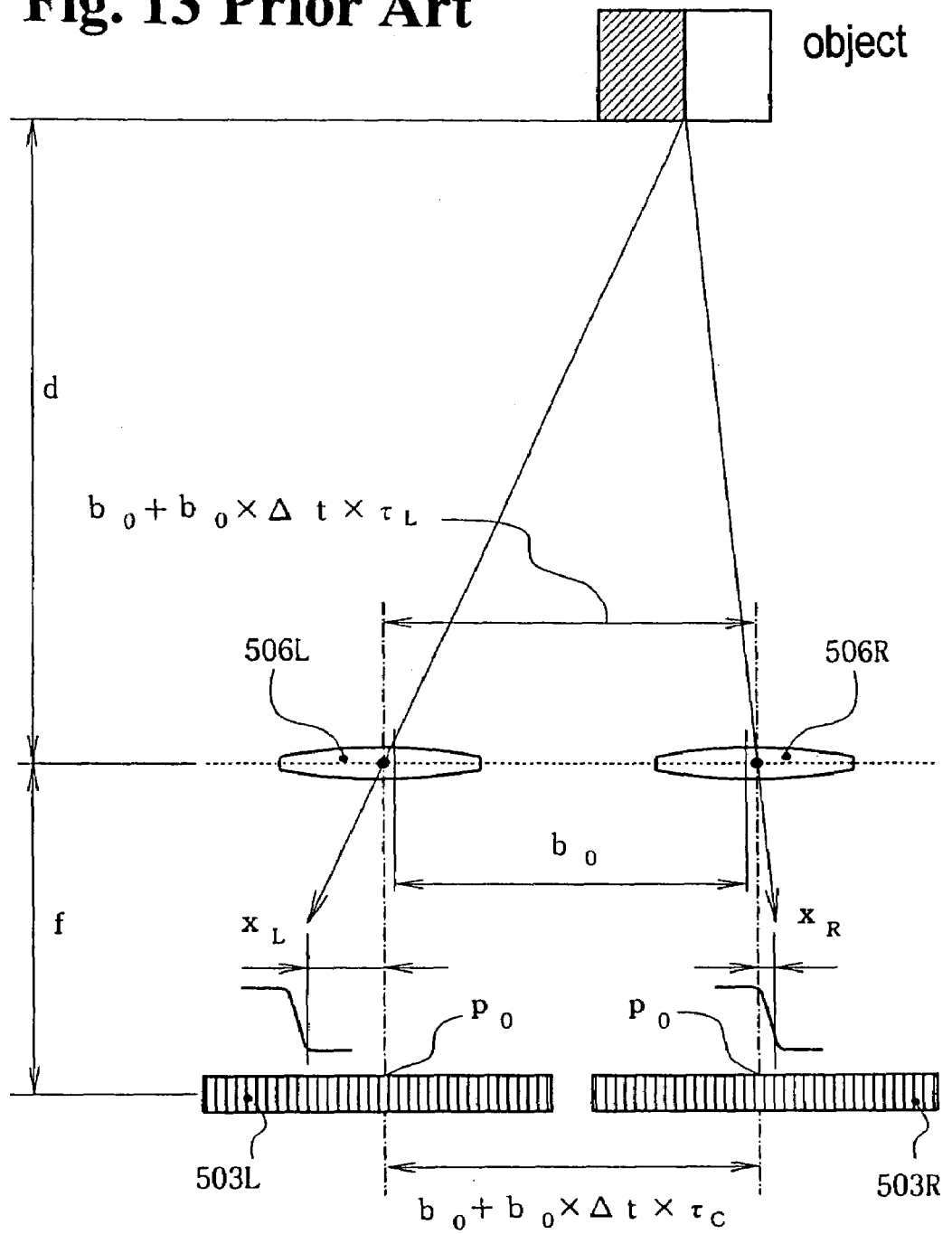

RANGE FINDER

BACKGROUND OF THE INVENTION AND RELATED ART STATEMENT

The present invention relates to an optical range finder or distance measuring device used for a camera.

An optical device provided in a camera uses a method such as an active method or a passive method for measuring a distance. In the active method, light is emitted toward an object, and a distance to the object is determined with triangulation. In the passive method, light irradiated from an object is detected, and a distance to the object is determined through a difference in phases of the light.

The active method will be described below in detail. An active range finder includes a light emitting unit having a light emitting element such as a light emitting diode (LED), a light emitting lens, a light receiving lens, and a light receiving unit having a light detecting element such as a position sensitive detector (PSD). The light emitting unit emits light toward an object through the light emitting lens, and the light receiving unit receives the light reflected from the object through the light receiving lens.

The light detecting element outputs an electrical signal according to a position of a light detecting plane where the light reflected from the object irradiates. Accordingly, it is possible to determine an angle of the incident light emitted through the light emitting lens based on the electrical signal according to the position of the light detecting plane. Therefore, it is possible to determine a distance to the object through the principle of triangulation using the incident angle and a distance between the light emitting lens and the light receiving lens.

An example of the passive method will be explained next in detail with reference to FIGS. 11(a)–11(c) and 12. FIG. 11(a) is a top plan view of a passive range finder. FIG. 11(b) is a cross sectional view taken along line 11(b)—11(b) in FIG. 11(a). FIG. 11(c) is a side view of the passive range finder shown in FIG. 11(a). FIG. 12 is a diagram for explaining the principle of the passive method. As shown in FIGS. 11(a) through 11(c), a passive range finder 500 includes a package 501, leads 502, a semiconductor chip 503, bonding wires 504, an optical casing 505, and a lens unit 506.

As shown in FIGS. 11(a) and 12, the lens unit 506 includes a first lens 506L and a second lens 506R arranged side by side with a certain distance b therebetween. As shown in FIG. 11(a), the first lens 506L and second lens 506R are integrated into the lens unit 506, for example, by resin molding.

As shown in FIG. 12, a semiconductor chip 503 includes a first light detecting section 503L and a second light detecting section 503R. The first and second light detecting sections 503L and 503R include many light detectors such as complementary metal oxide semiconductors (CMOS) and charge coupled devices (CCDs) arranged side by side. The passive range finder 500 also includes an A/D converting unit 507, an operating unit 508, and a CPU 509 for processing a signal. The A/D converting unit 507, operating means 508, and CPU 509 connected to each other via leads 502 process the signal outputted from the semiconductor chip 503 for determining a distance to an object.

The passive method for determining a distance will be explained next. As shown in FIG. 12, the first and second lenses 506L and 506R are spaced apart by a reference distance b. The first and second light detecting sections 503R and 503L are mounted on a surface of the semiconductor chip 503, and the semiconductor chip 503 is disposed at a location away from the first and second lenses 506L and 506R by a focal length f of the first and second lenses 506L and 506R. The light from the object is focused on the first light detecting section 503L through the first lens 506L and on the second light detecting section 503R through the second lens 506R, so that an image of the object away from the range finder 500 by a distance d is obtained.

When the object is located at an infinite distance from the range finder 500, two parallel rays $i_o$ passing through the first and second lenses 506L and 506R are incident on reference points $P_O$ on the first and second light detecting sections 503L and 503R. When the object is located at a finite distance d from the range finder 500, an image of the object is formed at a point $P_L$ on the first light detecting section 503L shifted from the reference point $P_O$ by a displacement $X_L$ and at a point PR on the second light detecting section 503R shifted from the reference point $P_O$ by a displacement $X_R$. In this case, the distance d is expressed by equation (1) using the displacements $X_L$ and $X_R$.

$$d = b \times f / (X_L + X_R) \tag{1}$$

The reference distance b and the focal length f are known characteristics of the range finder 500. Accordingly, the distance d is obtained from the displacements $X_L$ and $X_R$ of the image of the object formed on the first and second light detecting sections 503L and 503R.

Based on the principle of the distance measurement described above, each light detecting device outputs a signal according to an intensity of the light, and the range finder 500 outputs an image signal of the object. The A/D converting unit 507 conducts A/D conversion of the image signal and outputs image data. The operating unit 508 processes the image data to obtain the distance d, and outputs distance data. The CPU 509 conducts control operations such as displaying the distance d on a display (not shown) using the distance data. Accordingly, the passive range finder determines a distance to an object based on the principle as described above.

In the range finder using the conventional technique, a measured distance tends to have an error due to thermal expansion and thermal contraction caused by a temperature change (hereinafter the thermal expansion and thermal contraction caused by a temperature change will be referred to collectively as the "thermal expansion and contraction"). An error of the measured distance will be referred to as "measured distance error." The measured distance error will be described in detail below with reference to FIG. 13. FIG. 13 is a diagram for explaining a cause of the measured distance error.

In the conventional range finder, a lens distance b between optical axes of the first and second lenses 506L and 506R changes due to the thermal expansion and contraction. A distance between reference elements on the first and second light detecting sections 503L and 503R is also changed by the thermal expansion and contraction. Suppose that the lens distance is equal to $b_O$ at a temperature $t_O$ in an initial state, and a thermal expansion coefficient of a material of the lens is $\tau_L$. When the temperature changes by $\Delta t$, the lens distance b between the first and second lenses 506L and 506R is described by equation (2).

$$b = b_O + b_O \times \Delta t \times \tau_L \tag{2}$$

The term $b_O \times \Delta t \times \tau_L$ represents an increment or a decrement of the lens distance caused by the thermal expansion and contraction. When the semiconductor chip has a thermal expansion coefficient $\tau_C$, the distance between the first and second light detecting sections 503L and 503R (distance between the reference points $P_O$ changes as described by equation (3).

$$b = b_O + b_O \times \Delta t \times \tau_C \quad (3)$$

As described above using equation (1), the distance d to the object is determined using the lens distance b between the first and second lenses 506L and 506R. Therefore, when the lens distance b and the detecting device distance b change relatively, the displacements $X_L$ and $X_R$ from the reference points $P_O$ change, thereby causing the measured distance error.

The measured distance error will be explained next. When the distance between the first and second lenses 506L and 506R is $b_O$ and the focal length of the lenses is $f_O$ at the temperature to in the initial state, the distance d to the object is expressed by equation (4) according to equation (1).

$$d = b_0 \times f_0 / (X_L + X_R) \quad (4)$$

The initial lens distance $b_O$ and the initial focal length $f_O$ of the lenses are known constants. When the temperature of the range finder 500 changes by $\Delta t$, the term $b_0 \times f_0$ in equation (4) is changed accordingly. The change of the term $b_0 \times f_0$ is small relative to a value of the term $b_0 \times f_0$ within a temperature change $\Delta t$ of several tens of degrees. On the other hand, the lens distance b of the lenses and the detecting device distance b of the semiconductor chips are seriously affected by the thermal expansion and contraction.

When the temperature is changed by $\Delta t$, the distance d' is approximately expressed by equation (5), where the thermal expansion coefficient of the lens material is $\tau_L$ and the thermal expansion coefficient of the semiconductor chip material is $\tau_C$.

$$d' = b_0 \times f_0 / \{X_L + X_R - b_0 \times \Delta t (\tau_L - \tau_C)\} \quad (5)$$

As can be seen in equation (5), the temperature change $\Delta t$ has a significant effect on the term $b_0 \times \Delta t (\tau_L - \tau_C)$. As a result, the measured distance d' is greatly deviated from the actual distance d. An example of the measured distance error will be described in detail below.

Suppose that the temperature in the initial state is 25° C., the temperature change $\Delta t$ is +20° C., the lens distance $b_O$ is 5.5 mm, the focal length of the lenses $f_O$ is 6.0 mm, the thermal expansion coefficient $\tau_L$ of the lens made of polycarbonate is $7.0 \times 10^{-5}$/° C., the thermal expansion coefficient $\tau_C$ of the semiconductor chip made of silicon is $2.5 \times 10^{-6}$/° C., and the actual distance d to the object is 1000 mm. The total displacement $(X_L + X_R)$ is given as follows using equation (1):

$$(X_L + X_R) = 0.033 \text{ mm} \quad (6)$$

The temperature change $\Delta t$ creates an influence expressed as follows:

$$b_0 \times \Delta t (\tau_L - \tau_C) \approx 0.074 \text{ mm} \quad (7)$$

The distance d' after the temperature change is calculated using these values to be about 1290 mm. The measured distance d' is greatly deviated from the actual distance d due to the temperature change. To reduce the adverse influence of the temperature change in the range finder, various techniques have been considered.

Japanese Patent No. 3310079 has disclosed a technique in which range finders having two different lens distances, i.e. large and small, are combined and switched depending on a temperature to reduce the measured distance error.

Japanese Patent Publication No. 10-232128 has disclosed a range finder having a temperature sensor disposed in an instrument housing for measuring a temperature at every operation. In the range finder, a relationship between the measured distance and the temperature change is determined in advance, so that the measured distance error due to the temperature change is predicted.

Japanese Patent Publication No. 10-232128 has disclosed a technique in which a lens is positioned and fixed to a lens holder such that expansion or contraction of the lens is reduced when the lens holder is expanded or contracted due to an environmental change.

The conventional techniques described above have various problems. In the technique disclosed in Japanese Patent No. 3310079, the measured distance error is not essentially reduced. Further, it is necessary to provide two range finders and a space for the two range finders inside the instrument such as a camera, thereby making the range finder not practical.

The range finder disclosed in Japanese Patent Publication No. 10-232128 has the temperature sensor disposed in the vicinity of the range finder, and it is necessary to send the temperature data to a control system for correction in response to the temperature. Accordingly, it is necessary to provide the temperature sensor and an extra circuit for receiving the temperature data, and to conduct the complicated correction control, thereby increasing cost, the number of electronic circuits and control operations.

In the technique disclosed in Japanese Patent Publication No. 10-232128, it is possible to reduce the expansion or contraction of the lens. However, it is difficult to completely eliminate the expansion or contraction of the lens. Accordingly, it is necessary to provide a device for measuring a temperature as described above to reduce the expansion or contraction of the lens with high accuracy.

In view of the problems described above, the present invention has been made, and an object of the present invention is to provide a range finder with a simple structure capable of reducing the adverse influences of the thermal expansion and contraction.

Further objects and advantages of the invention will be apparent from the following description of the invention.

SUMMARY OF THE INVENTION

According to the present invention, a range finder is constructed such that a distance between two lenses and a distance between reference elements of first and second light detecting sections on a semiconductor chip do not change significantly relative to each other due to the thermal expansion or contraction. Specifically, a lens holder is provided for holding the two lenses, and is made of a material having a thermal expansion coefficient equal or close to a thermal expansion coefficient of the semiconductor chip, so that the distance between the lenses and the distance between the reference elements (reference points) of the first and second light detecting sections on the semiconductor chip do not change significantly relative to each other.

With the structure described above, it is possible to reduce a measured distance error caused by a temperature change, and to determine a distance to an object more accurately.

According to the present invention, the range finder includes a package having a lead integrated with the package; the semiconductor chip connected to the package by die-bonding and including a first light detecting section and a second light detecting section formed thereon; connecting means for electrically connecting the semiconductor chip to the lead; an optical casing bonded to the package; a first lens and a second lens; and a lens holder bonded to the optical casing and including a first lens hole and a second lens hole for holding the first lens and the second lens. The lens holder has a thermal expansion coefficient equal or close to that of the semiconductor chip.

According to the present invention, the lens holder is made of a material such as 42 alloy (Fe-42% Ni), 50 alloy (Fe-50% Ni), Amber alloy (Fe-36% Ni), super amber alloy, Kovar, crystallized glass, heat resistant glass, and ceramics containing boron. In the range finder of the invention, the lens holder has the thermal expansion coefficient equal or close to the thermal expansion coefficient of the semiconductor chip. Accordingly, it is possible to closely match the thermal expansion or contraction of the distance between the lenses to the thermal expansion or contraction of the distance between the reference elements on the semiconductor chip, thereby reducing the measured distance error caused by the temperature change.

According to the present invention, the range finder may further include an elastic adhesive layer bonding the optical casing and the lens holder. The range finder may further include an elastic adhesive layer die-bonding the package and the semiconductor chip. An adhesive is coated to form the adhesive layer for bonding the optical casing and the lens holder or the adhesive layer for die-bonding the package and semiconductor chip. The adhesive layers are not solidified completely after curing thereof, and remain elastic. With the elastic adhesive layers, it is possible to absorb and equalize a difference caused by the thermal expansion and contraction, and to reduce a relative displacement.

According to the present invention, the first and second lenses may be made of glass and bonded to the first and second lens holes by adhesion. The first and second lenses are made of glass having a small thermal expansion or contraction and bonded to the lens holder. Accordingly, it is possible to reduce a relative displacement.

According to the present invention, in the range finder, the lens holder may have two holes on a bisector perpendicular to a line connecting centers of the first and second lens holes, and the optical casing may have two bosses for inserting into the holes. The two bosses of the optical casing are fitted into the holes of the lens holder, so that the optical casing is fixed to the lens holder. The lens holder is positioned using the bosses of the optical casing as reference. Accordingly, the semiconductor chip does not move relative to the lens holder with a centerline connecting the bosses as the reference. As a result, it is possible to reduce an influence of the thermal expansion and contraction of the optical casing on the measured distance error.

According to the present invention, the lens holder may have a circular hole and a long hole. The long hole is extended in a direction perpendicular to the line between the optical axes of the lenses (along the line connecting the bosses) Therefore, it is possible to reduce an influence of the thermal expansion and contraction of the optical casing in the direction on the lens holder.

According to the present invention, in the range finder, each of the first and second lenses may be made of a transparent resin and may have a reference boss and an absorbing boss. The lens holder may include circular reference holes and long absorbing holes on a line between the centers of the first and second lens holes. When the first and second lenses are attached to the first and second lens holes of the lens holder, the reference bosses are fixed to the circular reference holes with an elastic adhesive layer, and the absorbing bosses are moveably inserted into the long absorbing holes. In general, a lens made of a resin exhibits thermal expansion and contraction larger than that of a lens made of glass. Accordingly, the long absorbing holes and the absorbing bosses are provided for absorbing the thermal expansion and contraction of the resin lens relative to the lens holder, thereby reducing the thermal expansion and contraction within an acceptable range.

According to the present invention, in the range finder, the lens holder may have two holes on a bisector perpendicular to a line connecting centers of the first and second lens holes, and the optical casing may have two bosses inserting into the holes. The two bosses of the optical casing are fitted into the holes of the lens holder, so that the optical casing is fixed to the lens holder. The lens holder is positioned using the bosses of the optical casing as reference. Accordingly, the semiconductor chip does not move relative to the lens holder with a centerline connecting the bosses as the reference. As a result, it is possible to reduce an influence of the thermal expansion and contraction of the optical casing on the measured distance error.

According to the present invention, in the range finder, the lens holder may include two holes on a bisector perpendicular to a line between centers of the first circular reference hole at a side of the first lens and the second circular reference hole at a side of the second lens. The optical casing may have two bosses for inserting into the holes. The two bosses of the optical casing are fitted into the holes of the lens holder, so that the optical casing is fixed to the lens holder. The optical casing is fixed to the lens holder at the bisector perpendicular to the line between the first circular reference hole at the side of the first lens hole (reference boss on the first lens) and the second circular reference hole at the side of the second lens hole (reference boss on the second lens). Accordingly, it is possible to balance between the thermal expansion and contraction of the lens holder and the thermal expansion and contraction of the first and second lenses at the optical axes of the first and second lenses. As a result, the optical axes of the first and second lenses equally move in the same direction, thereby reducing the measured distance error caused by the thermal expansion or contraction.

In the invention, the optical casing, the lens holder, and the first and second lenses are disposed at proper positions. Accordingly, when the temperature changes, the constituent parts are expanded or contracted in a balanced way by utilizing a difference among the coefficients of the thermal expansion of the materials of the optical casing, the lens holder and the lenses. Therefore, the displacements of the constituent parts are canceled out with each other, and the optical axes of the lenses move symmetrically in a lateral direction. Further, there is little difference in the thermal expansion and contraction between the lenses and the semiconductor chip, thereby eliminating measured distance error.

According to the present invention, the lens holder may have a circular hole and a long hole. The long hole is extended in a direction perpendicular to the line between the optical axes of the lenses (along the line connecting the bosses). Therefore, it is possible to reduce an influence of the thermal expansion or contraction of the optical casing in the direction on the lens holder.

BRIEF DESCRIPTION OF THE DRAWING FIGURES

FIGS. 1(a) to 1(c) are views showing a range finder according to an embodiment of the present invention, wherein FIG. 1(a) is a plan view thereof, FIG. 1(b) is a cross sectional view taken along line 1(b)—1(b) in FIG. 1(a), and FIG. 1(c) is a cross sectional view taken along line 1(c)—1(c) in FIG. 1(a);

FIGS. 2(a) and 2(b) are views showing components of the range finder shown in FIGS. 1(a) to 1(c), wherein FIG. 2(a) is a top view of an optical casing, and FIG. 2(b) is a top view of a lens holder;

FIG. 3 is a schematic diagram describing an image formation through a lens;

FIGS. 4(a) to 4(c) are views showing a range finder according to another embodiment of the present invention, wherein FIG. 4(a) is a plan view thereof, FIG. 4(b) is a cross sectional view taken along line 4(b)—4(b) in FIG. 4(a), and FIG. 4(c) is a cross sectional view taken along line 4(c)—4(c) in FIG. 4(a);

FIGS. 5(a) to 5(d) are views showing components of the range finder shown in FIGS. 4(a) to 4(c)., wherein FIG. 5(a) is a plan view of a lens holder, FIG. 5(b) is a front view of a lens, FIG. 5(c) is a bottom view of the lens, and FIG. 5(d) is a side view of the lens;

FIG. 6 is a plan view of the range finder for explaining adhesive layers and thermal expansion and contraction thereof;

FIGS. 7(a) to 7(c) are views showing a range finder according to a further embodiment of the present invention, wherein FIG. 7(a) is a plan view thereof, FIG. 7(b) is a cross sectional view taken along line 7(b)—7(b) in FIG. 7(a), and FIG. 7(c) is a right side view of the range finder;

FIGS. 8(a) and 8(b) are views showing components of the range finder shown in FIGS. 7(a) to 7(c), wherein FIG. 8(a) is a plan view of an optical casing, and FIG. 8(b) is a plan view of a lens holder;

Figure 12:
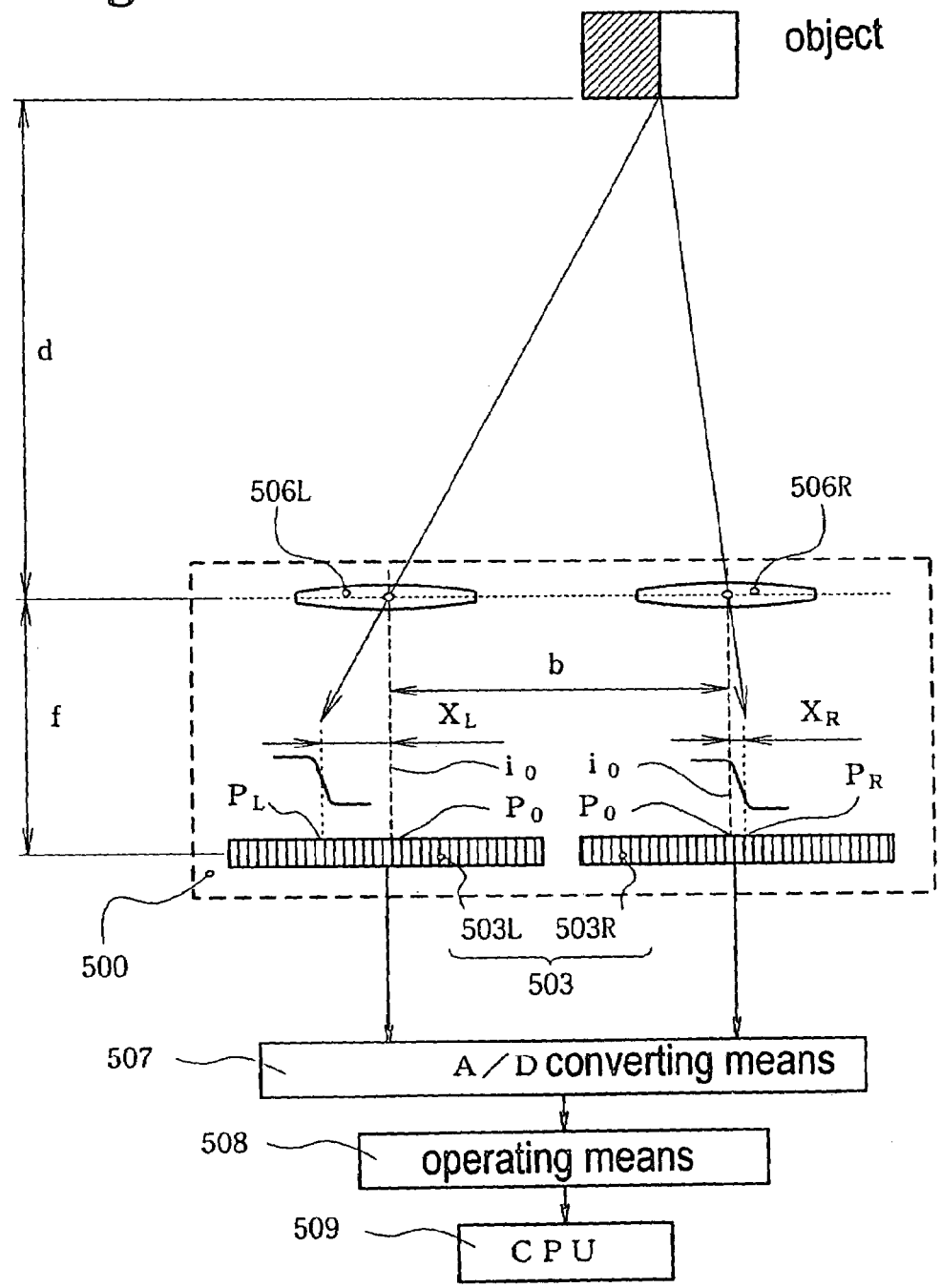

FIGS. 11(a) to 11(c) are views showing a passive range finder, wherein FIG. 11(a) is a plan view thereof, FIG. 11(b) is a cross sectional view taken along line 11(b)—11(b) in FIG. 11(a), and FIG. 11(c) is a side view of the passive range finder;

FIG. 12 is a diagram for explaining the principle of the passive measuring distance method; and FIG. 13 is a diagram for explaining a cause of a measured distance error.

DETAILED DESCRIPTION OF PREFERRED EMBODIMENTS

Figure 2A:
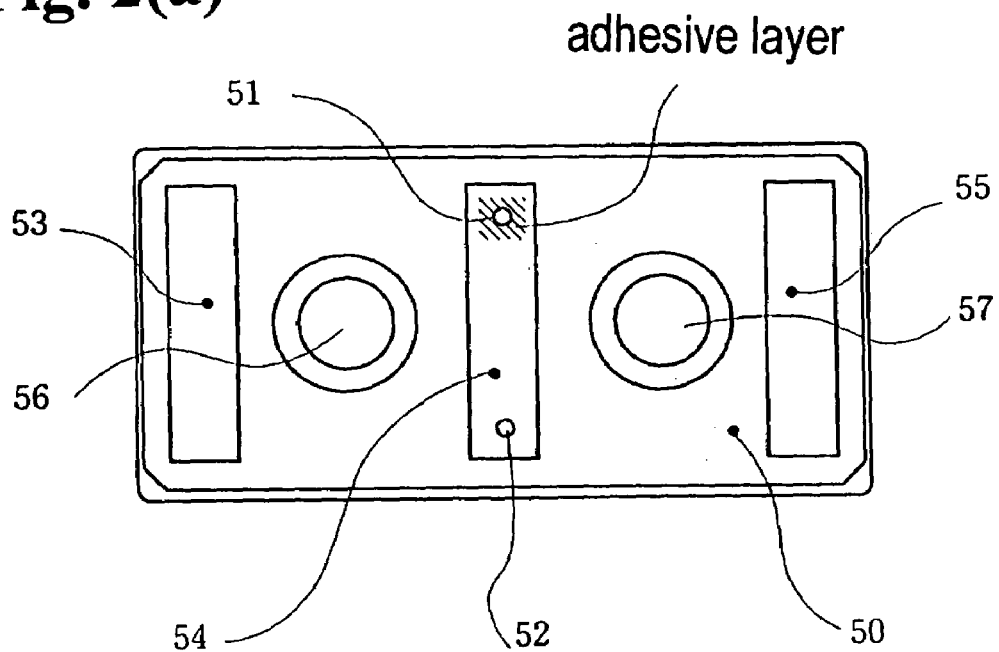
Figure 2B:
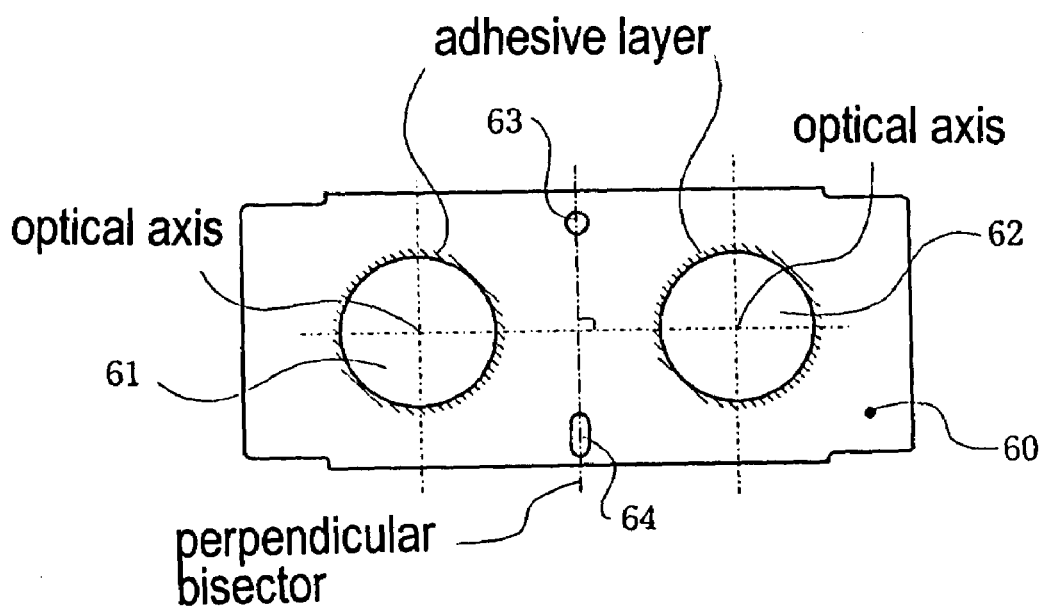
Figure 3:
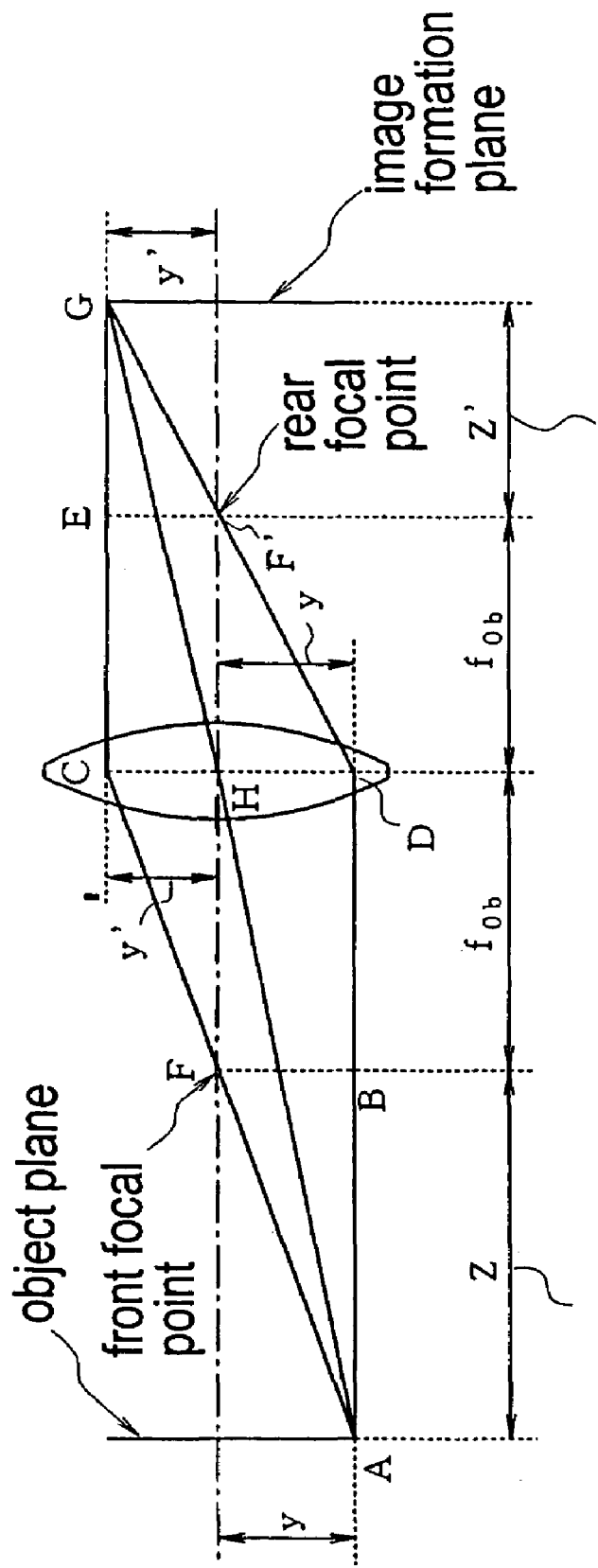

Hereunder, embodiments of the present invention will be described in detail with reference to the accompanied drawings. FIGS. 1(a) to 1(c) are views showing a range finder according to an embodiment of the present invention, wherein FIG. 1(a) is a plan view thereof, FIG. 1(b) is a cross sectional view taken along line 1(b)—1(b) in FIG. 1(a), and FIG. 1(c) is a cross sectional view taken along line 1(c)—1(c) in FIG. 1(a). FIGS. 2(a) and 2(b) are views showing components of the range finder shown in FIGS. 1(a) to 1(c), wherein FIG. 2(a) is a top view of an optical casing, and FIG. 2(b) is a top view of a lens holder. FIG. 3 is a schematic diagram describing a general image formation through a lens.

As shown in FIGS. 1(a) through 1(c), a range finder includes a package 10, leads 20, a semiconductor chip 30, bonding wires 40 for connecting the semiconductor chip 30 to the leads 20, an optical casing 50, a lens holder 60, lenses 71 and 72, and an adhesive layer 80. The lenses 71 and 72 are a pair of lenses, i.e. a first lens 71 on the left hand side and a second lens 72 on the right hand side.

The constituent parts will be described in detail next. The package 10 includes a transparent plate 11, a package casing 12, a back cover 13 and a sealant 14. The leads 20 are made of an alloy containing iron or copper as a main component. The package casing 12 is integrated with the leads 20, and includes a die-pad section 12a bonded to the semiconductor chip 30 by die-bonding. An adhesive is coated on the die-pad section 12a of the package casing 12 in advance, and the semiconductor chip 30 is bonded to the package casing 12 via the adhesive. The adhesive is cured to form the adhesive layer 80.

The semiconductor chip 30 includes a first light detecting section and a second light detecting section (not shown) formed on a surface thereof for detecting light. The first and second light detecting sections include light detecting elements such as CMOS devices and CCDs. Each of the detecting elements outputs a signal according to an intensity of the light (described later). The semiconductor chip 30 is electrically connected to the leads 20 via the bonding wires 40. The transparent plate 11 is bonded to the package casing 12 with fusion. The package casing 12 is turned upside down when the sealant 14 is injected into the package casing 12 from a backside thereof. The back cover 13 is bonded to the backside of the package casing 12 to complete the package 10.

The optical casing 50 is made of a resin capable of blocking light, and works as an aperture (described later). The optical casing 50 is fixed to the transparent plate 11 of the package 10. As shown in FIG. 2(a), two bosses 51, 52, pedestals 53, 54, 55 and aperture holes 56, 57 are formed in the optical casing 50. The bosses 51 and 52 protrude from the pedestal 54.

As shown in FIG. 2(b), the lens holder 60 has a plate shape, and includes a first lens hole 61, a second lens hole 62, a circular hole 63, and a long hole 64. The first and second lens holes 61 and 62 are provided for passing the light and for positioning the first and second lenses 71 and 72. As shown in an enlarged view in FIG. 1(c), the first and second lenses 71 and 72 have steps at cutting edges of outer peripheries thereof. Each of the steps includes a step side face 73, a step under face 74, and a cutting edge 75. An adhesive is coated on the step under faces 74 of the lenses 71 and 72 for bonding. The step side faces 73 are provided for positioning the lenses 71 and 72 relative to the first and second lens holes 61 and 62.

The first lens 71 is inserted into the first lens hole 61 and the second lens 72 is inserted into the second lens hole 62 with narrow gaps between the lens holes 61, 62 and the step side faces 73, 73 of the lenses 71, 72. As shown in FIG. 2(b), when the lenses 71 and 72 are attached to the lens holder 60, an adhesive such as an epoxy resin and sealant glass is coated around the first and second lens holes 61 and 62. The step side faces 73 and step under faces 74 of the first and second lenses 71 and 72 are pressed against around the first and second lens holes 61 and 62, and the adhesive is cured to form the adhesive layers between the lenses 71, 72 and the lens holder 60.

As shown in FIG. 2(b), a circular hole 63 and a long hole 64 are formed in the lens holder 60 on a bisector perpendicular to a line connecting the centers of the first and second lens holes 61 and 62 (line connecting optical axes of the first and second lenses 71 and 72). The long hole 64 extends along the bisector.

When the lens holder 60 described above is attached to the optical casing 50, an adhesive is coated on a specific portion of the optical case 50 in advance (for example, a hatching area around the boss 51 on the pedestal 54 shown in FIG.

2(a), where the adhesive layer 80 is formed). The bosses 51 and 52 of the optical casing 50 are inserted into the circular hole 63 and long hole 64 of the lens holder 60, respectively, so that the lens holder 60 is fixed to the optical casing 50. No adhesive layer is formed on the pedestals 53 and 55 at the left and right sides and around the boss 52 (described later).

An optical function of the range finder 1 will be described next. The first and second lenses 71 and 72 receive light from an object, and focus the light on the surface of the semiconductor chip 30. A distance between the lenses 71, 72 and the semiconductor chip 30 is determined by a focal length f of the first and second lenses 71 and 72.

As described above, the optical casing 50 blocks extra external light, and the first and second lenses 71 and 72 focus the light on the semiconductor chip 30 while the aperture holes 56 and 57 are adjusting the light intensity. The first and second light detecting sections receive the light focused on the surface of the semiconductor chip 30, and convert the light to an electrical signal.

A way of reducing an error of the distance measurement, a specific feature of the invention, will be described next. In the range finder 1 according to the embodiment, the lens holder 60 has a thermal expansion coefficient equal or close to that of the semiconductor chip 30. Accordingly, when a temperature changes, the thermal expansion and contraction of a distance between the lenses match the thermal expansion and contraction of a distance between reference elements on the semiconductor chip, so that the measured distance error is reduced. In general, the semiconductor chip 30 is constructed according to a required function with little flexibility of change. Therefore, the lens holder 60 is adjusted to match the thermal expansion coefficient thereof to that of the semiconductor chip 30.

The principle of reducing the measured distance error by adjusting the thermal expansion coefficient of the lens holder 60 will be described next. When the range finder 1 is used at a temperature of 25° C., the thermal expansion coefficient $\tau_{c25}$ of the semiconductor chip 30 made of silicon is about $2.5 \times 10^{-6}/°$ C. When the lens holder 60 with the first and second lenses 71 and 72 mounted thereon is made of a material such as 42 alloy (Fe-42% Ni), the thermal expansion coefficient $\tau_{L25}$ of the lens holder 60 is $4.7 \times 10^{-6}/°$ C. The first and second lenses 71 and 72 are discrete and mounted independently on the lens holder 60. Therefore, when a temperature changes, the distance between the optical axes of the lenses 71 and 72 changes due to the thermal expansion and contraction of the lens holder 60.

Suppose that a temperature in the initial state is 25° C., a temperature change Δt is 20° C., the lens distance b is 5.5 mm, the focal length of the lenses f is 6.0 mm, the thermal expansion coefficient $\tau_{L25}$ of the lens holder 60 made of 42 alloy is $4.7 \times 10^{-6}/°$ C., the thermal expansion coefficient $\tau_{c25}$ of the semiconductor chip 30 made of silicon is $2.5 \times 10^{-6}/°$ C., and an actual distance d to an object is 1000 mm. The total displacement $(X_L+X_R)$ is given as follows using equation (4):

$$(X_L+X_R)=0.033 \text{ mm} \qquad (8)$$

The temperature change Δt creates an influence expressed as follows:

$$b_0 \times \Delta t(\tau_L-\tau_C) \approx 0.000242 \text{ mm} \qquad (9)$$

A distance d' measured after the temperature change is given by the following equation (10).

$$d'=b_0 \times f_0/\{X_L+X_R-b_0 \times \Delta t(\tau_L-\tau_C)\} \approx 1007.38 \text{ mm} \qquad (10)$$

A deviation from the actual distance is about 7 mm, resulting in a great improvement from the conventional technique.

It is necessary to place a plane on which an image is formed (hereinafter referred to as "image formation plane") within a specific range, i.e. a focal depth, based on characteristics on a lens of a camera for recording an image. As shown in FIG. 3, according to a relation of forming an image through a lens, when a focal point of the lens is $f_{Ob}$, and a ratio (magnification) between a size y of the object and a size y' of the image is M (=y'/y), a distance Z between the object and a front focal point is expressed by equation (11).

$$Z=f_{Ob}/M \qquad (11)$$

A distance Z' between the image and a rear focal point is expressed by equation (12).

$$Z'=f_{Ob} \times M \qquad (12)$$

According to equations (11) and (12), when the focal length of the lens $f_{Ob}$ is 25 mm, and the distance d between the object and the lens is 1000 mm, the magnification M is given by equation (13).

$$M=f_{Ob}/Z=25/(1000-25) \approx 0.02564 \qquad (13)$$

The distance Z' between the image and the rear focal point is calculated by equation (14).

$$Z'=f_{Ob} \times M=25 \times 0.02564 \approx 0.6410 \text{ mm} \qquad (14)$$

When the temperature changes and the range finder 1 has an error in the distance caused by the thermal expansion and contraction, the magnification M is given by equation (15) in which the foregoing measured distance d' is 1007 mm.

$$M_{\Delta 20}=f_{Ob}/M_{\Delta 20}=25 \times (1007-25) \approx 0.02546 \qquad (15)$$

The distance Z' between the image and the rear focal point is given by equation (16).

$$Z'_{\Delta 20}=f_{Ob} \times M_{\Delta 20}=25 \times 0.02546 \approx 0.6364 \text{ mm} \qquad (16)$$

Accordingly, the image formation plane is shifted by 0.0046 mm due to the temperature change. In general, the focal depth, i.e. a tolerance for the position of the plane on which an image is formed by a shooting lens, is $\pm \epsilon \times F$ for the ideal position of the image formation, wherein $\epsilon$ is a diameter of a tolerable blur circle on the image formation plane, and F is an F number of the lens. The F number is a value obtained by dividing the focal length f of the lens by a diameter D of the lens.

In a case of a camera using a film, when the diameter of the tolerable blur circle $\epsilon$ is 30 μm and the F number of the lens is 2, the focal depth is given by equation (17).

$$\pm \epsilon \times F = \pm 60 \text{ μm} \qquad (17)$$

In a case of a digital camera using a light detecting element such as CCD, a pixel size is about 3.5 μm square. In general, a digital camera uses blue, green and red filters mounted on a surface of CCDs, and four light detecting elements are combined as one unit. Therefore, when a diagonal line of a square containing the four light detecting elements is considered as the diameter of the tolerable blur circle, the diameter of the tolerable blur circle $\epsilon'$ is given by equation (18).

$$\epsilon'=\sqrt{2} \times (3.5) \times 2 \approx 9.9 \text{ μm} \qquad (18)$$

When the F number of the lens is 2, the focal depth is given by equation (19).

$$\pm \epsilon' \times F \approx \pm 19.8 \text{ μm} \qquad (19)$$

Accordingly, the image formation plane is shifted by a mere 4.6 μm relative to the focal depths calculated above due to the temperature change Δ20° C. Therefore, the range finder according to the invention is effective for providing a camera for recording an image with distance data to an object. The range finder is particularly effective for the digital camera, in which a light detecting area, a pixel size, and a focal depth are small.

In the embodiment, 42 alloy is used for the material of the lens holder 60. Alternatively, a material having a thermal expansion coefficient close to that of the semiconductor chip 30 may be used for the lens holder 60. More specifically, the lens holder 60 may be formed of a material having a thermal expansion coefficient equal or close to that of the semiconductor chip 30 in a range between −20° C. and +60° C. Such a material includes an alloy such as 42 alloy (58% Fe-42% Ni, the thermal expansion coefficient is $4.7 \times 10^{-6}$), 50 alloy (50% Fe-50% Ni, the thermal expansion coefficient is $9.5 \times 10^{-6}$), amber alloy (63% Fe-32% Ni-5% C, thermal expansion coefficient thereof is $0 \sim 1 \times 10^{-6}$), and Kovar (Fe-27% Ni-15% C, the thermal expansion coefficient is $5 \times 10^{-6}$); a glass material such as crystallized glass (the thermal expansion coefficient is $3.9 \sim 5.3 \times 10^{-6}$), heat resisting glass (the thermal expansion coefficient is $3.9 \sim 5.3 \times 10^{-6}$), and boron ceramic (the thermal expansion coefficient is $5.5 \sim 8.5 \times 10^{-6}$); and a material having a similar thermal expansion coefficient. The material for the lens holder 60 is selected according to the semiconductor chip 30. When the semiconductor chip 30 is made of silicon, the materials described above have the thermal expansion coefficients for obtaining the measured distance error within the tolerable range.

According to the present invention, additional features may be provided for reducing the adverse influences of the thermal expansion and contraction. In an embodiment, an adhesive having certain elasticity after being cured is selected for the adhesive layer between the optical casing 50 and the lens holder 60. Further, such an adhesive is selected for the adhesive layer for bonding the semiconductor chip 30 to the package 10.

As described earlier, an adhesive is coated in advance on the die-pad section 12a of package casing 12 when the semiconductor chip 30 is bonded to the package 10 by die-bonding. After the adhesive is cured, the adhesive layer 80 is formed to integrate the semiconductor chip 30 and the package 10. The bosses 51 and 52 on the optical casing 50 are inserted into the circular hole 63 and long hole 64 of the lens holder 60 when the optical casing 50 and lens holder 60 are assembled. The adhesive is coated around the boss 51 in advance, and the adhesive layer 80 is formed by curing to fix the lens holder 60 to the optical casing 50.

The adhesive layers 80 between the semiconductor chip 30 and the package 10 and between the lens holder 60 and the optical casing 50 have rubber elasticity even after the curing thereof. More specifically, the adhesive layers 80 have durometer hardness from 40 to 70. The durometer hardness is specified in ASTM D2240 (ISO868, JISK7215).

The adhesive layers 80 have the rubber elasticity to relax a displacement and an internal stress associated with the displacement between the semiconductor chip 30 and the package 10 or between the optical casing 50 and the lens holder 60 due to the thermal expansion and contraction. Accordingly, the semiconductor chip 30 and lens holder 60 are prevented from deformation. In a case of heat cycle that the thermal expansion and contraction are repeated, it is possible to prevent a fatigue failure of the adhesive layers 80 and interfaces thereof due to the thermal expansion and contraction between the semiconductor chip 30 and the package 10 or between the optical casing 50 and the lens holder 60.

Further, since the semiconductor chip 30 and the package 10 or the optical casing 50 and the lens holder 60 are bonded via the elastic adhesive layer 80, the displacement due to the thermal expansion and contraction is spread and equalized in the bonding planes. Accordingly, it is possible to reduce a relative displacement between the semiconductor chip 30 and the package 10 or between the lens holder 60 and the optical casing 50.

As a measure for further reducing the influences of the thermal expansion and contraction, in an embodiment of the invention, the first and second lenses 71 and 72 are made of a glass material having a thermal expansion coefficient close to that of the lens holder 60. The first lens 71 is inserted into the first lens hole 61 and the second lens 72 is inserted into first lens hole 62, so that the first and second lenses 71 and 72 are bonded to the lens holder 60 independently.

When the range finder 1 shown in FIGS. 1(a) to 1(c) is assembled, the first and second lenses 71 and 72 may be attached to the lens holder 60 with an adhesive. The structure and the assembling method described above are employed considering a condition in which the lenses 71, 72 and the adhesive are exposed to the heat cycle repeating a high temperature and a low temperature.

The first lens 71, second lens 72, and lens holder 60 have small sizes, and are formed of materials having small thermal expansion coefficients. The adhesive layers are formed of a material such as sealant glass having a thermal expansion coefficient close to that of the lenses 71 and 72 and the lens holder 60, so that a difference between the thermal expansion coefficients of the materials is small. As a result, when the lens holder 60 with the lenses 71 and 72 mounted thereon is exposed to the heat cycle, it is possible to prevent a breakdown in the adhesive layers and the interfaces thereof.

As a measure for further reducing the influences of the thermal expansion and contraction, in an embodiment of the invention, the lens holder 60 has the circular hole 63 and the long hole 64 formed on a bisector perpendicular to a line connecting centers of the first and second lens holes 61 and 62 (line connecting optical axes of the first and second lenses 71 and 72). When the lens holder 60 and the optical casing 50 are assembled, the bosses 51 and 52 of optical casing 50 are inserted into the circular hole 63 and the long hole 64 of the lens holder 60.

When a temperature changes, a displacement is caused between the optical casing 50 and the lens holder 60 due to the thermal expansion and contraction. Especially when the optical casing 50 is made of a resin, such a displacement tends to be large. When the bosses 51 and 52 of the optical casing 50 are inserted to the holes 63 and 64, the insertion positions work as reference points for the lens holder 60. When the optical casing 50 expands or contracts laterally (horizontal direction in FIG. 1(a)), the lens holder 60 stays at the reference points. Therefore, positions of the first and second lenses 71 and 72 and the lens distance b are not affected by the thermal expansion and contraction of the optical casing 50, thereby eliminating the displacement of the optical axes of the first and second lenses 71 and 72. Since the adhesive layer 80 on the pedestal 54 shown in FIG. 2(a) is elastic, the lens holder 60 is not affected by the thermal expansion and contraction of the optical casing 50.

The lens holder 60 is not bonded to the pedestal 54 at a side of the boss 52, so that the boss 52 moves freely in the hole 64 relative to the boss 51 when the optical casing 50 thermally expands or contacts in the front and rear direction (vertical direction in FIG. 1(a)). Accordingly, the lens holder 60 is not affected by the thermal expansion and contraction of the optical casing 50. The light detecting device extends in the front and rear direction (vertical direction in FIG. 1(a)). Therefore, the thermal expansion and contraction of the optical casing 50 in the front and rear direction (vertical direction in FIG. 1(a)) is optically acceptable.

The invention has been described above with reference to the first embodiment. The invention is not limited to the specific embodiment, and any changes and modifications are possible within the scope of the invention.

Figures 4A, 4B, 4C:
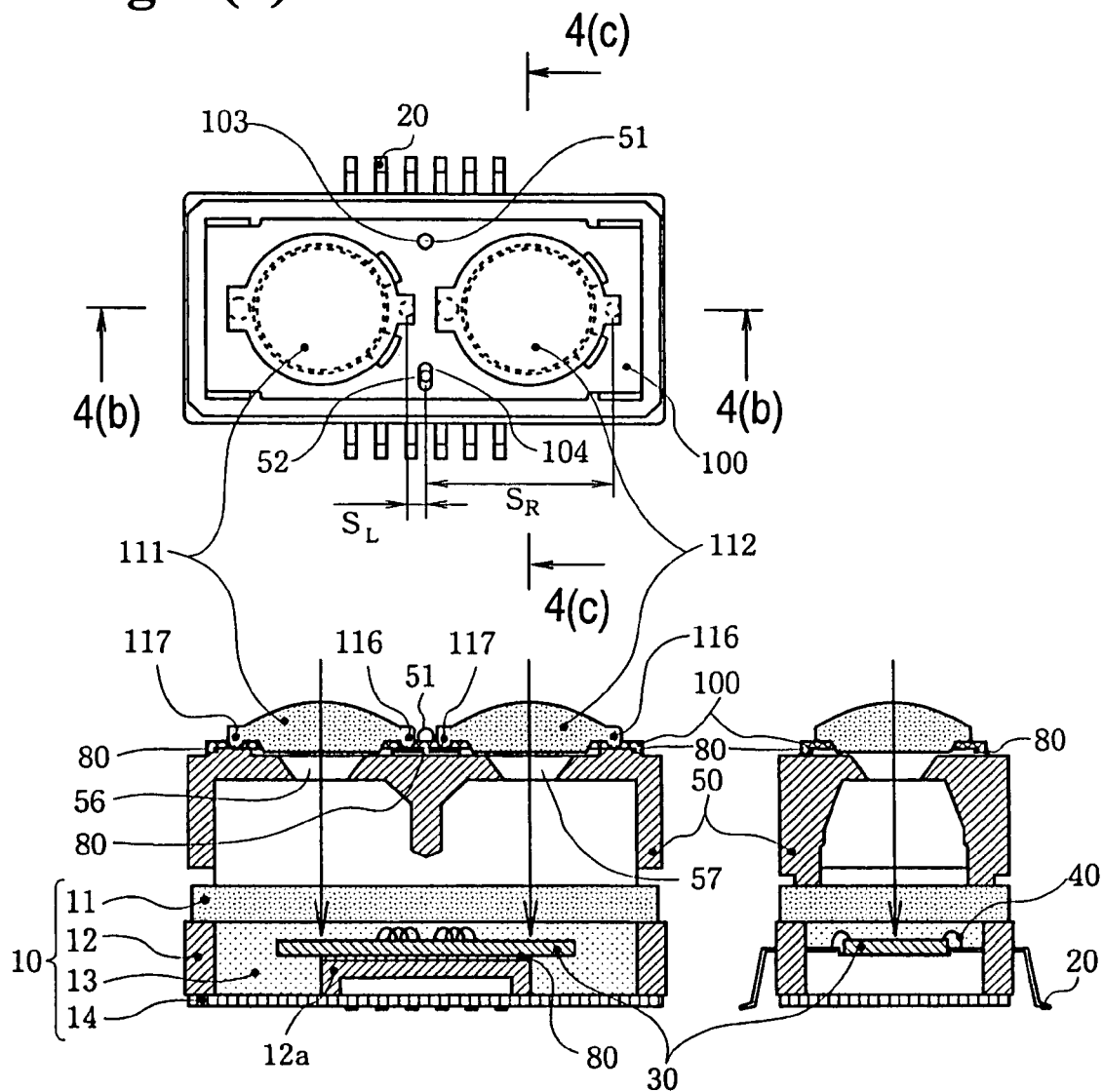
Figure 6:
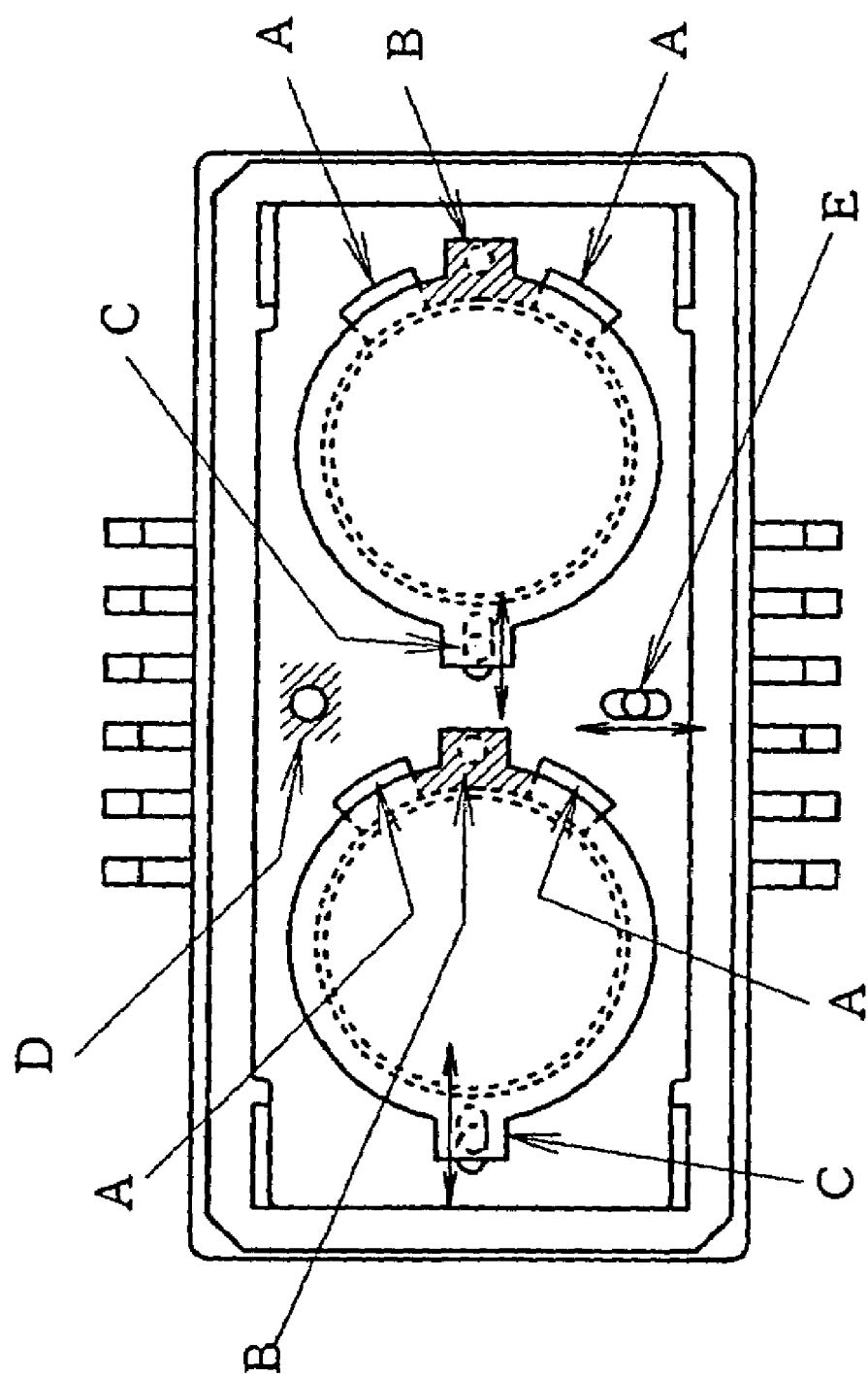

A second embodiment of the invention will be described next with reference to FIGS. 4(a) through 6. FIGS. 4(a) to 4(c) are views showing a range finder according to the second embodiment of the present invention, wherein FIG. 4(a) is a plan view thereof, FIG. 4(b) is a cross sectional view taken along line 4(b)—4(b) in FIG. 4(a), and FIG. 4(c) is a cross sectional view taken along line 4(c)—4(c) in FIG. 4(a). FIGS. 5(a) to 5(d) are views showing components of the range finder shown in FIGS. 4(a) to 4(c), wherein FIG. 5(a) is a plan view of a lens holder, FIG. 5(b) is a front view of a lens, FIG. 5(c) is a bottom view of the lens, and FIG. 5(d) is a side view of the lens. FIG. 6 is a plan view of the range finder for explaining an adhesion therein and thermal expansion and contraction thereof.

As shown in FIGS. 4(a) through 4(c), a range finder includes the package 10, the leads 20, the semiconductor chip 30, the bonding wires 40, the optical casing 50, a lens holder 100, lenses 111 and 112, and the adhesive layers 80. The lenses 111 and 112 are a pair of two separate lenses, namely a first lens 111 on the left hand side and a second lens 112 on the right hand side.

According to the second embodiment, the first and second lenses 111 and 112 are made of a resin. A transparent resin exhibits larger thermal expansion and contraction than glass. In contrast to the glass lenses described in the first embodiment, when the first and second lenses 111 and 112 are bonded to the lens holder 100 by adhesion, it is possible to create a large stress in the first and second lenses 111 and 112 due to a difference in the thermal expansion or contraction between the lenses 111, 112 and the lens holder 100. As a result, the stress may cause deformation of the first and second lenses 111 and 112, and an optical characteristic of the range finder may be impaired. Further, under the heat cycle, a cyclic stress may be caused in the adhesive layers and the interfaces thereof between the first and second lenses 111 and 112 and the lens holder 100. As a result, the adhesive layers and the interfaces may be broken down due to fatigue caused by the cyclic stress.

Accordingly, in the second embodiment, a part of the arrangement in the range finder of the first embodiment is modified. The first and second lenses 111 and 112 are made of a transparent resin, and are inserted into first and second lens holes 101 and 102 of the lens holder 100, respectively. The lenses 111 and 112 are attached to the lens holder 100 with elastic adhesive layers. As compared with the first embodiment, the lens holder 100 and the lenses 111 and 112 in the range finder of the second embodiment are different. Other components are same as those in the first embodiment. The same reference numerals as those in the first embodiment designate the same components, and descriptions thereof are omitted.

Similar to the first embodiment, the lens holder 100 is made of a material having a thermal expansion coefficient close to that of a material of the semiconductor chip 30. As shown in FIG. 5(a), a circular hole 103, a long hole 104, two circular reference holes 105, two long holes for absorbing displacement (hereinafter referred to as "long absorbing holes") 106 and slits 107 are formed in the lens holder 100.

The first and second lenses 111 and 112 are made of a transparent resin such as, for example, polycarbonate. As shown in an enlarged view in FIG. 5(b), the first and second lenses 111 and 112 have steps formed at cutting edges of outer peripheries thereof. Each of the steps includes a step side face 113, a step under face 114, and a cutting edge 115. A reference boss 116 and a boss for absorbing displacement (hereinafter referred to as "absorbing boss") 117 are formed on the step under face 114.

The first and second lens holes 101 and 102 of the lens holder 100 have gaps wide enough to absorb the thermal expansion and contraction of the lenses 111 and 112 relative to the step side faces 113 of the lenses 110. The boss 51 on the optical casing 50 is inserted into the circular hole 103, and the boss 52 on the optical casing 50 is inserted into the long hole 104.

The reference bosses 116 on the first and second lenses 111 and 112 are inserted and fixed to the respective circular reference holes 105. The absorbing bosses 117 on the first and second lenses 111 and 112 are moveably inserted into (inserted to but not fixed to) the respective long absorbing holes 106.

The circular reference holes 105 and long absorbing holes 106 are arranged on an extension of a line connecting the centers of the first and second lens holes 101 and 102 (line connecting the centers of the circular reference holes 105). The long absorbing holes 106 extend along the line connecting the centers of the first and second lens holes 101 and 102 (line connecting the centers of the circular reference holes 105). The slits 107 having a cutout fan shape are formed in the vicinity of the circular reference hole 105 such that the slits 107 sandwich the reference hole 105. The slits 107 are communicated with the first and second lens hole 101 and 102.

The first and second lenses 111 and 112 are fixed to the first and second lens holes 101 and 102 of the lens holder 100 by adhesion. The adhesive for bonding the first and second lenses 111 and 112 to the lens holder 100 has elasticity after being cured. As indicated by the arrows B in FIG. 6, the adhesive is coated only on portions of the step under faces 114 and step side faces 113 near the reference bosses 116 of the first lens 111 and the second lens 112. As indicated by the arrows A in FIG. 6, the slits 107 are formed for providing spaces to stop the adhesive from flowing further. Accordingly, the lenses 111 and 112 are bonded to the lens holder 100 at bonding areas between the slits 107. Only a small amount of the adhesive is applied, so that the adhesive stays in the hatched areas indicated by the arrows B in FIG. 6 and does not spread out.

The bonding areas are preferably symmetrical with respect to a line connecting the centers of the first and second lens holes 101 and 102 (line connecting the centers of the circular reference holes 105). The bonding areas are small, so that the thermal expansion and contraction thereof is small. Also, the elastic adhesive is used, so that the adhesive layers 80 and the interfaces thereof are not broken down by repeated temperature changes.

In the range finder, as shown in FIG. 4(a), the optical casing 50 is attached to the lens holder 100 at connected positions, i.e. the bosses 51 and 52 and the circular hole 103 and the long hole 104. Suppose that a distance between the reference boss 116 of the first lens 111 and a line between the connected positions is $S_L$, and a distance between the reference boss 116 of the second lens 112 and the line is $S_R$. In the range finder, it is arranged that a sum of the distances $(S_L + S_R)$ is equal to the reference distance b.

A mechanism of reducing the measured distance error in the range finder described above will be described next. When heated, the first and second lenses 111 and 112 show the following two behaviors: (1) a behavior due to the thermal change of the adhesive layers 80, and (2) a behavior due to the thermal expansion and contraction of the first and second lenses 111 and 112.

First, reduction of the measured distance error caused by the behavior (1) due to the thermal change of the adhesive layers 80 will be described. The first and second lenses 111 and 112 are connected to the lens holder 100 through the adhesive layers 80 formed between the lens holder 100 and the step side faces 113 and the step under faces 114 near the reference bosses 116 of the first and second lenses 111 and 112. It is difficult to make the amounts and the areas of the adhesive layers 80 exactly equal at the right and left hand sides. When a slight imbalance exists in the adhesive layers 80, the first and second lenses 111 and 112 may move slightly within the first and second lens holes 101 and 102 around the reference bosses 116 due to the temperature change, thereby causing displacements of the optical axes of the first and second lenses 111 and 112. Especially, it becomes more serious when the first and second lenses 111 and 112 rotate around the reference bosses 116. When the first and second lenses 111 and 112 rotate around the reference bosses 116, the first and second lenses 111 and 112 also move in a direction of the lens distance b therebetween, thereby changing the lens distance b and affecting the measured distance.

In the second embodiment, the circular reference holes 105 and long absorbing holes 106 are arranged on the extension of the line connecting the centers of the first and second lens holes 101 and 102 (line connecting the centers of the circular reference holes 105), and the long absorbing holes 106 extend along the extension of the line. When the lenses 111 and 112 rotate around the reference bosses 116 in the circular reference holes 105 due to the temperature change, the absorbing bosses 117 in the long absorbing holes 106 restrict the lenses 111 and 112. As a result, the displacement of the optical axes of the lenses 111 and 112 due to temperature change of the adhesive layers 80 is limited substantially to the line connecting the centers of the first and second lens holes 101 and 102 by the long absorbing holes 116 and the absorbing bosses 117. A change in the distance between the optical axes of the first and second lenses 111 and 112 is very small as compared with the lens distance b. Therefore, it is possible to reduce the influence of the change on the measured distance.

When the first and second lenses 111 and 112 are slightly shifted in a direction perpendicular to the line connecting the centers of the first and second lens holes 101 and 102 (connecting the centers of the two circular reference holes 105), the line connecting the optical axes of the first and second lenses 111 and 112 is shifted relative to the line connecting the centers of the first and second light detecting sections on semiconductor chip 30. The shift is small and little influence on the measured distance as compared with the change of the lens distance b.

Next, reduction of the measured distance error caused by the behavior (2) due to the thermal expansion and contraction will be described. The first and second lenses 111 and 112 thermally expand and contract with respect to the reference bosses 116. The absorbing bosses 117 move freely in the long absorbing holes 106, so that the first and second lenses 111 and 112 are not restricted. Therefore, the first and second lenses 111 and 112 do not deform even when there is a difference in the thermal expansion and contraction between the first and second lenses 111 and 112 and the lens holder 100.

The optical casing 50 is bonded to the lens holder 100 at the hatched portion of the boss 51 on the pedestal 54 (see FIG. 2(a)) as indicated by the arrow D in FIG. 6, but the pedestal 54 is not bonded to the lens holder 100 at the boss 52 as indicated by the arrow E in FIG. 6. Accordingly, when the optical casing 50 expands and contracts in the front and rear direction (vertical direction in FIG. 4(a)), the thermal expansion and contraction of the optical casing 50 is absorbed by the boss 52 and the long hole 104, thereby causing no influence on the lens holder 100. The light detecting elements extend in the front and rear direction (vertical direction in FIG. 4(a)). Accordingly, the thermal expansion and contraction of the optical casing 50 in the front and rear direction is optically acceptable.

The first and second lenses 111 and 112 expand and contact thermally with respect to the respective reference bosses 116 in a direction of the line connecting the centers of the first and second lens holes 101 and 102 (connecting the centers of the two reference holes 105). Accordingly, the thermal expansion and contraction of the first and second lenses 111 and 112 is canceled out by the movement of the optical axes of the first and second lenses 111 and 112 in the same direction. As a result, the change in the distance between the optical axes of the first and second lenses 111 and 112 is equal to the change in the distance between the bonding areas of the bosses 116 of the first and second lenses 111 and 112 and the holes 105 of the lens holder 100, thereby eliminating the measured distance error.

Figure 7A:
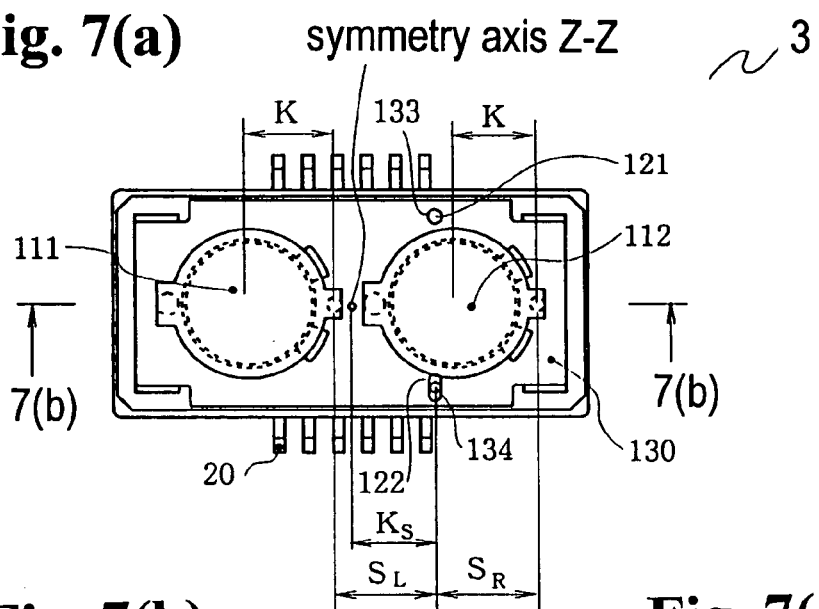
Figure 7A:
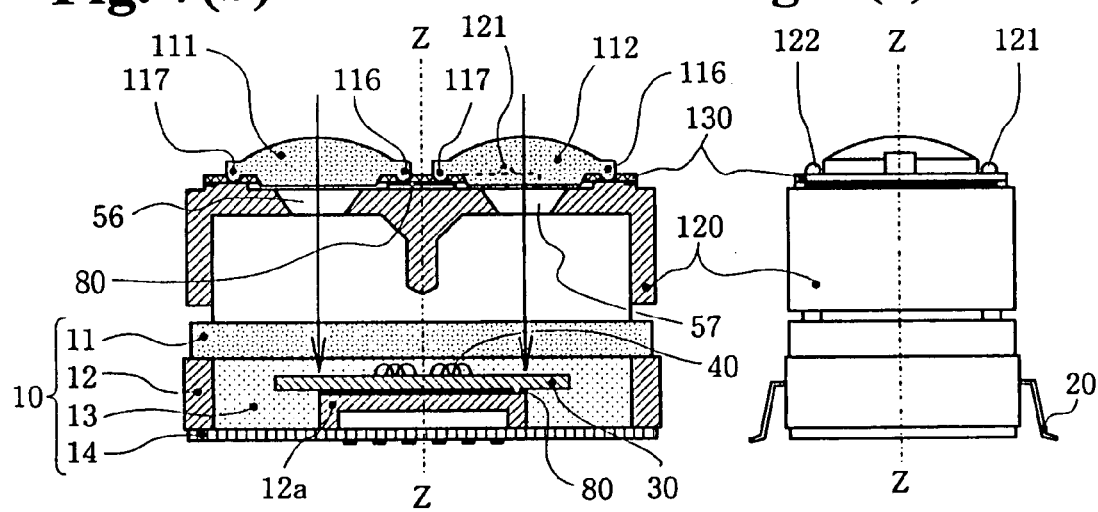
Figure 8A:
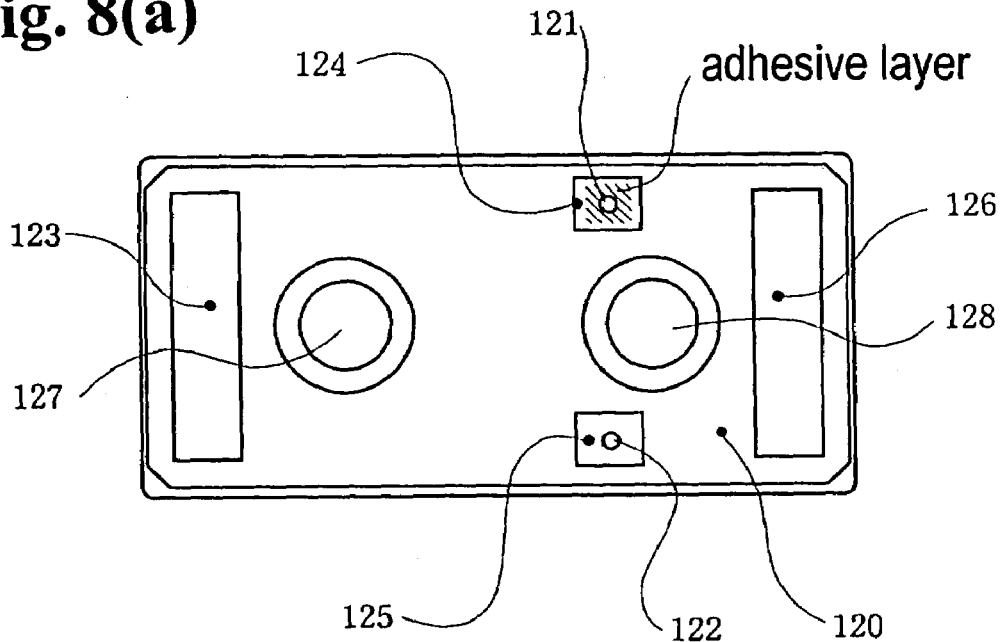
Figure 8B:
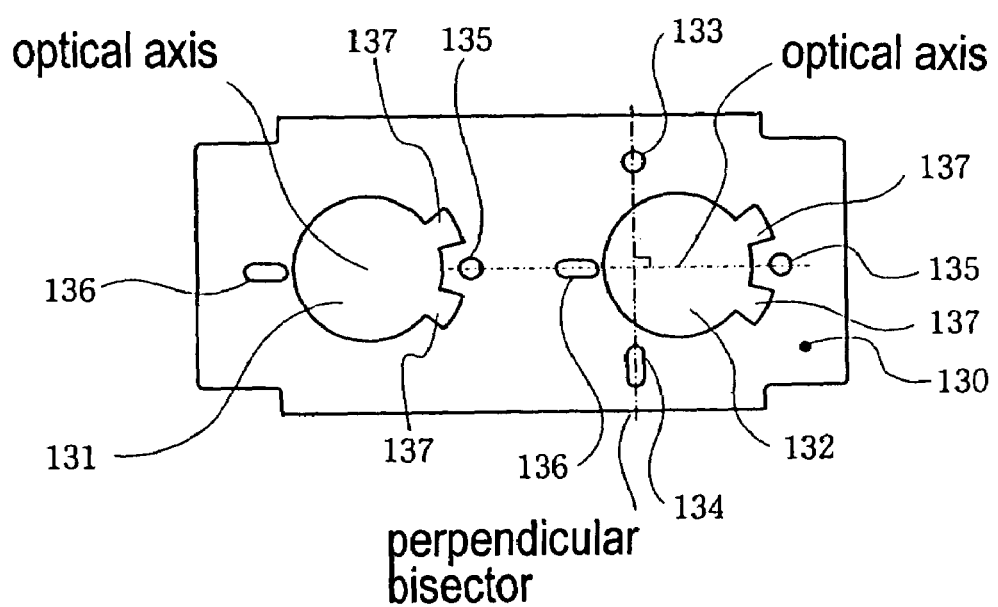
Figure 9:
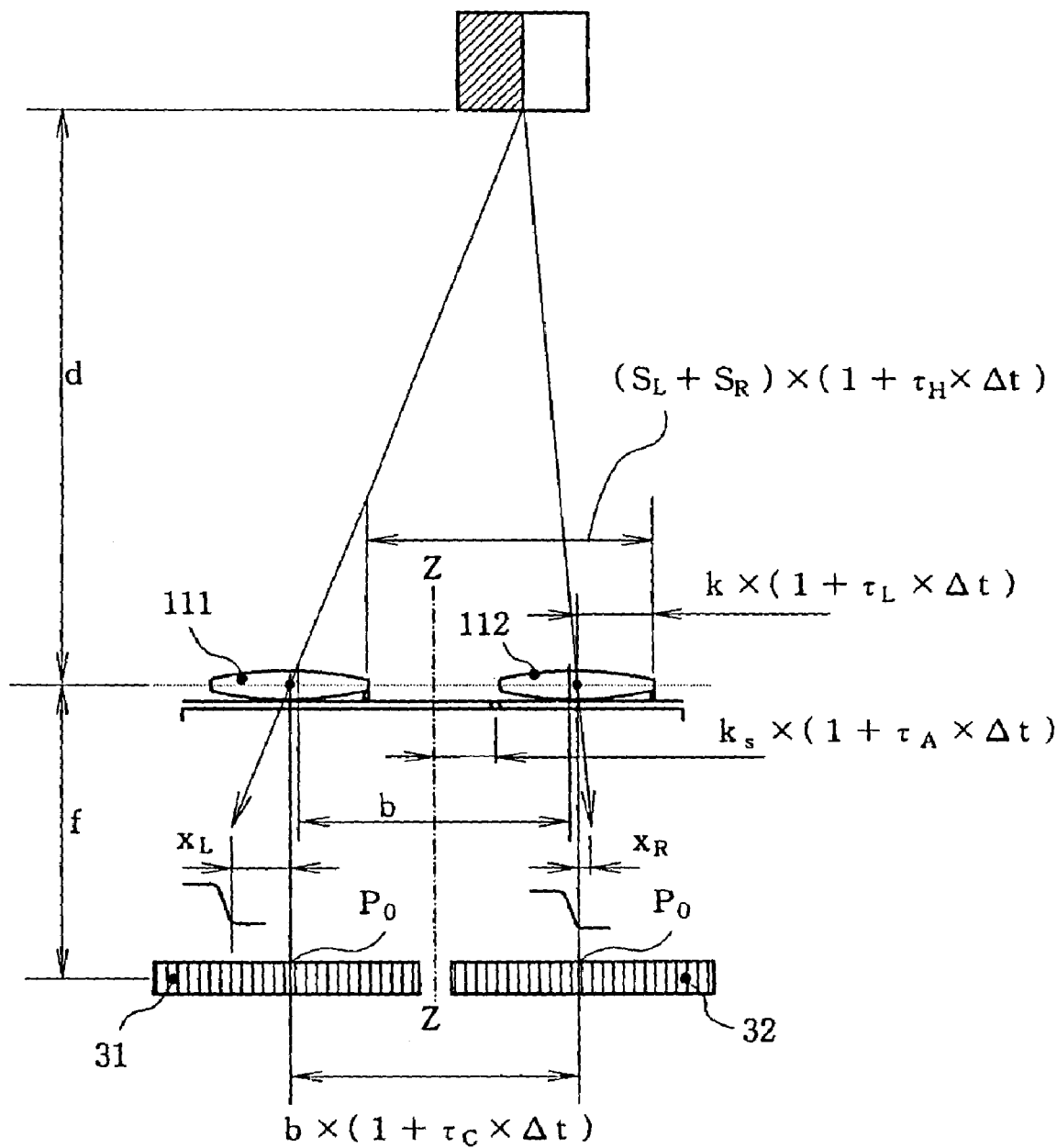
FIG. 9 is a diagram for explaining the principle of canceling the thermal expansion and contraction.

A third embodiment of the invention will be described with reference to FIGS. 7(a) through 9. FIGS. 7(a) to 7(c) are views showing a range finder according to the third embodiment of the present invention, wherein FIG. 7(a) is a plan view thereof, FIG. 7(b) is a cross sectional view taken along line 7(b)—7(b) in FIG. 7(a), and FIG. 7(c) is a right side view of the range finder. FIGS. 8(a) and 8(b) are views showing components of the range finder shown in FIGS. 7(a) to 7(c), wherein FIG. 8(a) is a plan view of an optical casing, and FIG. 8(b) is a plan view of a lens holder. FIG. 9 is a diagram for explaining the principle of canceling the thermal expansion and contraction.

As shown in FIGS. 7(a) through 7(c), in the third embodiment, a range finder 3 includes the package 10, the leads 20, the semiconductor chip 30, the bonding wires 40, an optical casing 120, a lens holder 130, a pair of lenses 110, and the adhesive layers 80. The lenses 110 are two discrete lenses, namely a first lens 111 on the left hand side and a second lens 112 on the right hand side. A circular hole 133 and a long hole 134 are formed on a bisector perpendicular to a line connecting two circular reference holes 135 of the lens holder 130 as shown in FIG. 8(b). Bosses 121 and 122 are formed on the optical casing 120. The optical casing 120 is attached to the lens holder 130 by inserting and coupling the boss 121 to the circular hole 133 and the boss 122 to the long hole 134. The optical casing 120 is made of a resin such as polycarbonate having a thermal expansion coefficient equal or close to the thermal expansion coefficient of the first and second lenses 111 and 112.

In the range finder shown in FIG. 4(a), the distance $S_L$ is different from the distance $S_R$. In other words, the right portion and the left portion are asymmetrical with respect to the reference line of the optical casing 50 and the lens holder 100. Therefore, there is a difference between the displacement of the semiconductor chip 30 (hereinafter referred to as the "semiconductor chip displacement") due to the temperature change and the change in the distance between the optical axes of the first and second lenses 111 and 112 (hereinafter referred to as the "optical axes displacement") due to the temperature change, thereby causing a small measured distance error.

The principle of canceling the semiconductor chip displacement and the optical axes displacement will be described next. The optical casing 120 is attached to the package 10 over the entire bonding plane thereof as shown in FIGS. 7(a) through 7(c). Accordingly, it is considered that the range finder 3 uniformly expands and contracts in all directions with respect to the symmetry axis Z—Z. It is arranged that the distance $K_S$ between the symmetry axis Z—Z and the reference line connecting the bosses 122 and 121 coupled to the circular hole 133 and the long hole 134 is equal to the distance K between the optical axis of the first or second lens 111 or 112 and the reference boss 116 thereon (between the circular reference hole 135 near the first or second lens hole 131 or 132 and the center of the first or second lens hole 131 or 132).

When the first and second lenses 111 and 112, the optical casing 120, and the lens holder 130 are assembled, the thermal expansion and contraction is caused symmetrically with respect to the symmetry axis Z—Z, that will be explained next using numerical expressions.

The optical casing 120 expands and contacts symmetrically with respect to the symmetry axis Z—Z seen from the semiconductor chip 30. Therefore, the lens holder 130 coupled to the optical casing 120 at the bosses 121 and 122 moves with the first and second lenses 111 and 112 mounted on the lens holder 130 as a unit, and a distance thereof is expressed by the following formula using the distance $K_S$, a thermal expansion coefficient $\tau_A$ of the optical casing 120, and a temperature change $\Delta t$.

$$S \times \tau_A \times \Delta t \qquad (20)$$

The first and second lenses 111 and 112 expand and contract symmetrically with respect to the reference line connecting the boss 121 coupled to the circular hole 133 and the boss 122 coupled to the long hole 134 by an amount determined by a thermal expansion coefficient $\tau_H$ of the lens holder 130, the distance $S_L$, the distance $S_R$, and the temperature change $\Delta t$.

The optical axes of the first and second lenses 111 and 112 move toward the absorbing bosses 117 from the reference bosses 116 of the first and second lenses 111 and 112. An amount of the thermal expansion and contraction is determined by the thermal expansion coefficient $\tau_L$ of the lenses 111 and 112, the distance K, and the temperature change $\Delta t$.

The thermal expansion coefficient $\tau_A$ of the optical casing 120 is equal to the thermal expansion coefficient $\tau_L$ of the lenses 111 and 112. The first and second lenses 111 and 112 are shifted with respect to the optical casing 120 in a direction opposite to the direction that the first and second lenses 111 and 112 are shifted with respect to the lens holder 130. Therefore, when the optical casing 120, the lens holder 130 and the lenses 111 and 112 are combined, the amounts of the thermal expansion and contraction are canceled out relative to the symmetry axis Z—Z, and only the displacement, i.e. $(S_L+S_R) \times \tau_H \times \Delta t$, of the lens holder 130 remains.

As a result, a variation in the distance measurement, i.e. a sum of the displacements $X_L+X_R$ from the reference point $P_O$, is determined by a difference in the thermal expansion coefficients between the semiconductor chip 30 and the lens holder 130. In the embodiment, the first and second lenses 111 and 112 and the lens holder 130 are arranged at the optimized positions with the optimized structure, so that the range finder has the small measured distance error even when the temperature changes.

Figure 10:
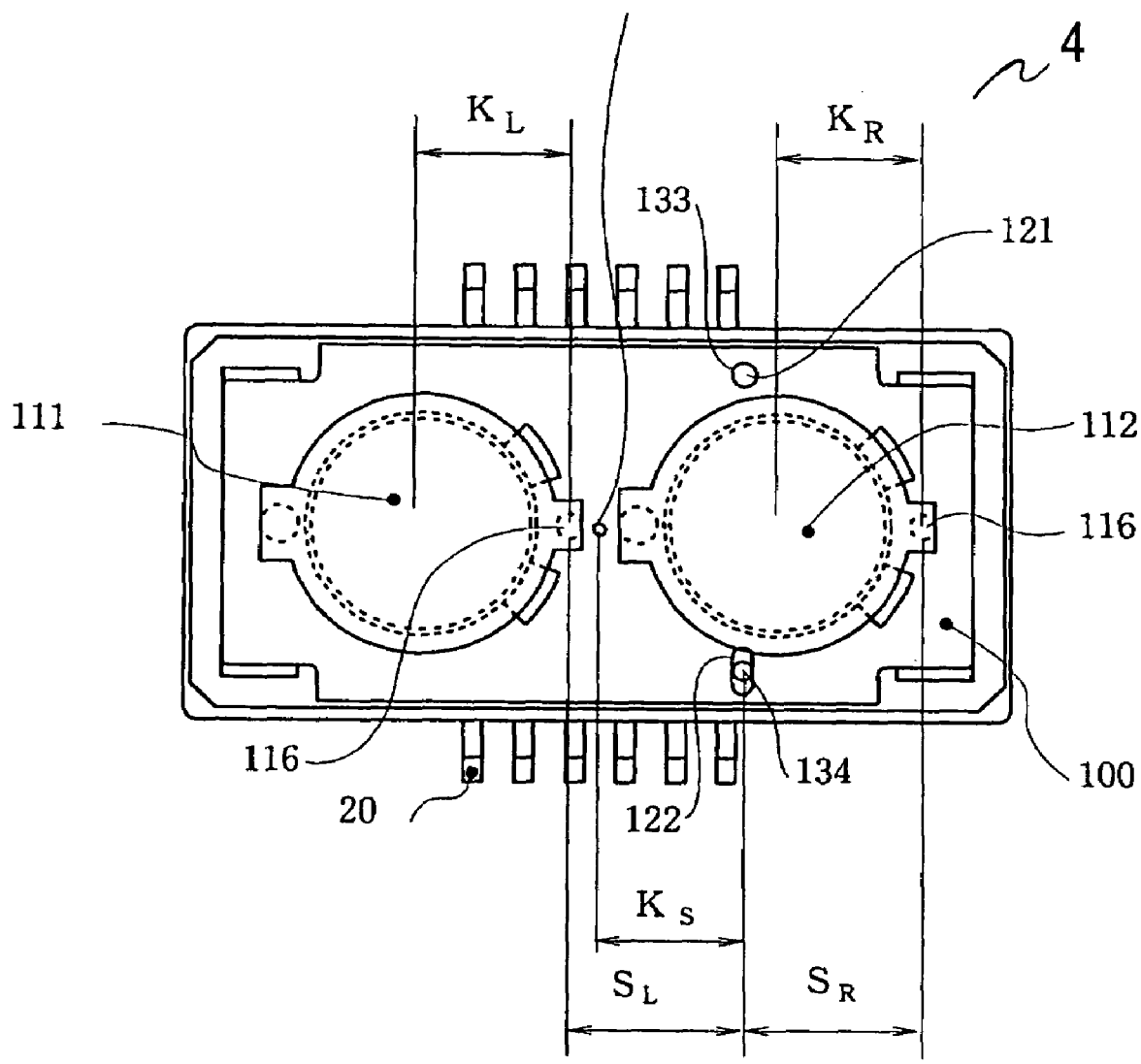
FIG. 10 is a plan view of a range finder according to a still further embodiment of the invention.

A fourth embodiment of the invention will be described next with reference to FIG. 10. FIG. 10 is a top view of a range finder according to the fourth embodiment. In the fourth embodiment, the range finder has a structure basically same as that of the range finder in the third embodiment, and the canceling principle thereof is more generalized. In the embodiment, it is assumed that $K_L$ is not equal to $K_R$.

In the embodiment shown in FIG. 10, the optical casing 120, the lens holder 130 and the lenses 111 and 112 have thermal expansion coefficients different from each other. It is arranged such that a combination of the optical casing 120, the lens holder 130, and the lenses 111 and 112 as a whole has the thermal expansion and contraction close to that of the semiconductor chip 30.

First, it is arranged that the reference bosses 116 of the first and second lenses 111 and 112 on the lens holder 130 expand and contract symmetrically with respect to the reference line connecting the boss 121 coupled to the circular hole 133 and the boss 122 coupled to the long hole 134, as expressed by equation (21).

$$S_L = S_R \qquad (21)$$

The thermal expansion and contraction of the reference distance b on the semiconductor chip 30 and the thermal expansion and contraction of the first and second lenses 111 and 112 on the lens holder 130 have a relationship expressed by equation (22).

$$(S_L+S_R) \times \tau_H - (K_R-K_L) \times \tau_L = b \times \tau_C \qquad (22)$$

Based on equation (22), the distances $S_R$, $S_L$, $K_R$, and $K_L$ are determined so that the thermal expansion and contraction of the reference distance b on the semiconductor chip 30 matches to the thermal expansion and contraction of the distance between the optical axes of the first and second lenses 111 and 112.

Then, it is arranged that the thermal expansion and contraction of the distance $K_S$ (distance between the symmetry axis Z—Z and the line connecting the bosses 121 and 122 on the optical casing 120, or connecting the circular hole 133 and the long hole 134 of the lens holder 130) matches to the thermal expansion and contraction of an average distance $(K_L+K_R)/2$ (average of the distance $K_L$ between the optical axis of the first lens 111 and the reference boss 116 thereof and the distance $K_R$ between the optical axis of the second lens 112 and the reference boss 116 thereof), as expressed by equation (23).

$$K_S \times \tau_A = (K_L+K_R) \times \tau_L/2 \qquad (23)$$

The right term of equation (23) represents a moving distance of the center of gravity of a system consisting of the two lenses relative to the lens holder. The optical axes of the first and second lenses 111 and 112 are shifted symmetrically with respect to the center of the chip, and the change in the distance between the optical axes of the lenses is equal or close to the thermal expansion and contraction of the semiconductor chip 30. When these conditions are met, the range finder reduces the measured distance error due to the temperature change.

In the range finder according to the fourth embodiment, it is basically assumed that $K_L$ is not equal to $K_R$. As far as the conditions described by equations (21) and (22) are met, the range finder is applicable when $K_L$ is equal to $K_R$.

As described above, according to the invention, the optical range finder includes the first and second lenses attached independently to the lens holder. The lens holder is formed of a material having the thermal expansion coefficient equal or close to that of the semiconductor chip. Accordingly, the range finder of the invention reduces the measured distance error caused by the temperature change and can be used without correction.

Further, the range finder according to the invention reduces the measured distance error caused by the temperature change. Accordingly, the range finder is suitable for a camera for recording an image to provide distance data to an object. The range finder is especially suitable for a digital camera in which a light detecting area is small, a size of the light detecting element is small, and a focal depth is shallow. In summary, the range finder according to the invention has a simple structure and reduces the adverse effects of the thermal expansion and contraction.

While the invention has been explained with reference to the specific embodiments of the invention, the explanation is illustrative and the invention is limited only by the appended claims.

What is claimed is:

1. A range finder comprising:
   a package having a lead,
   a semiconductor chip attached to the package and having a first light detecting section and a second light detecting section,
   connecting means for electrically connecting the semiconductor chip to the lead,
   an optical casing attached to the package,
   a first lens and a second lens, and
   a lens holder attached to the optical casing and having a first lens hole and a second lens hole for holding the first lens and the second lens, said lens holder being formed of a material having a thermal expansion coefficient substantially equal to a thermal expansion coefficient of the semiconductor chip,
   wherein each of said first and second lenses is formed of a transparent resin and has a reference boss and an absorbing boss, and said lens holder has circular reference holes and long absorbing holes on a line connecting centers of the first and second lens holes, each of said reference bosses being inserted into one circular reference hole and fixed by an elastic adhesive layer while one absorbing boss is moveably inserted into one long absorbing hole to attach each of the first and second lens to each of the first and second lens holes.

2. A range finder according to claim 1, wherein said material is selected from the group consisting of 42 alloy, 50 alloy, amber alloy, super amber alloy, Kovar, crystallized glass, heat resistant glass, and ceramic containing boron.

3. A range finder according to claim 1, further comprising a first adhesive layer for bonding the optical casing and the lens holder, said first adhesive layer having elasticity.

4. A range finder according to claim 1, further comprising a second adhesive layer for bonding the package and the semiconductor chip, said second adhesive layer having elasticity.

5. A range finder according to claim 1, wherein said lens holder has two holes on a bisector perpendicular to a line connecting the circular reference holes, and said optical casing has two bosses for inserting into the two holes to attach the optical casing to the lens holder.

6. A range finder according to claim 5, wherein one of the circular reference holes is formed adjacent to the first lens hole, and the other of the circular reference holes is formed adjacent to the second lens hole.

7. A range finder according to claim 6, wherein one of said two holes is a circular hole and the other of said two holes is a long hole.

8. A range finder according to claim 1, wherein said lens holder has a slit adjacent to the circular reference holes for accommodating an extra portion of the elastic adhesive layer.

* * * * *

UNITED STATES PATENT AND TRADEMARK OFFICE
CERTIFICATE OF CORRECTION

PATENT NO. : 7,046,344 B2  
APPLICATION NO. : 10/759278  
DATED : May 16, 2006  
INVENTOR(S) : Toshio Yamamoto et al.

It is certified that error appears in the above-identified patent and that said Letters Patent is hereby corrected as shown below:

Please change column 2, line 17, "PR" to -- $P_R$ --,

Column 3, line 2, "Po" to -- Po) --,

Column 3, line 15, "to" to -- $t_o$ --,

Column 3, line 40, "25°C.," to -- 25°C, --,

Column 3, line 41, "25°C.," to -- 25°C, --,

Column 3, line 44, "7.0 x $10^{-5}$/°C.," to -- 7.0 x $10^{-5}$/°C, --,

Column 3, line 46, "25°C.," to -- 25°C, --,

Column 3, line 54, "bo x $\Delta$t ($\tau_L$- $\tau_C$)≈0.074mm" to -- "bo x $\Delta$t ($\tau_L$- $\tau_C$)≈0.0074mm --, Column 5, line 52, "bosses)" to -- bosses). --, Column 7, line 14, "4(c).," to -- 4(c), --, Column 9, line 38, "25°C.," to -- 25°C, --, Column 9, line 49, "25°C.," to -- 25°C, --, Column 9, line 50, "25°C.," to -- 25°C, --, Column 9, line 53, "4.7 x $10^{-6}$/°C.," to -- 4.7 x $10^{-6}$/°C, --, Column 9, line 55, "2.5 x $10^{-6}$/°C.," to -- 2.5 x $10^{-6}$/°C, --, Column 9, line 62, "bo x $\Delta$t ($\tau_L$- $\tau_C$)≈0.000242mm"  
to -- bo x $\Delta$t x($\tau_L$- $\tau_C$)≈0.000242mm --, Column 9, line 66, "d′=bo x $f_o$/{$X_L$ + $X_R$ - bo x $\Delta$t ($\tau_L$- $\tau_C$)}≈1007.38mm"  
to -- d′=bo x $f_o$/{($X_L$ + $X_R$) - bo x $\Delta$t ($\tau_L$- $\tau_C$)}≈1007.38mm --, Column 10, line 31. "$M_{\Delta 20}$ = fob/$M_{\Delta 20}$ = 25x(1007-25)≈ 0.02546"  
to -- $M_{\Delta 20}$ = fob/$M_{\Delta 20}$ = 25/(1007-25)≈0.02546 --, Column 11, line 13, "-20°C." to -- -20°C --,

UNITED STATES PATENT AND TRADEMARK OFFICE
CERTIFICATE OF CORRECTION

PATENT NO. : 7,046,344 B2
APPLICATION NO. : 10/759278
DATED : May 16, 2006
INVENTOR(S) : Toshio Yamamoto et al It is certified that error appears in the above-identified patent and that said Letters Patent is hereby corrected as shown below:

Column 14, line 16, there is not line feed between "long hole 104." and "The reference bosses 116...", and Column 17, line 35, "S x $\tau_A$ x $\Delta$t" to -- Ks x $\tau_A$ x $\Delta$t --.

Signed and Sealed this

Tenth Day of October, 2006

JON W. DUDAS
*Director of the United States Patent and Trademark Office*